(12) United States Patent
Matsumoto

(10) Patent No.: US 12,241,572 B2
(45) Date of Patent: Mar. 4, 2025

(54) HOLDER FOR LONG MEMBER

(71) Applicant: PIOLAX, INC., Kanagawa (JP)

(72) Inventor: Tomoyuki Matsumoto, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 15 days.

(21) Appl. No.: 18/498,818

(22) Filed: Oct. 31, 2023

(65) Prior Publication Data

US 2024/0151324 A1  May 9, 2024

(30) Foreign Application Priority Data

Nov. 4, 2022 (JP) ................................. 2022-177138

(51) Int. Cl.
*F16L 3/06* (2006.01)

(52) U.S. Cl.
CPC ..................... *F16L 3/06* (2013.01)

(58) Field of Classification Search
CPC ....................................................... F16L 3/06
See application file for complete search history.

(56) References Cited

U.S. PATENT DOCUMENTS

| 6,206,330 | B1 * | 3/2001 | Oi ........................... F16L 3/223 |
| | | | 248/68.1 |
| 6,708,931 | B2 * | 3/2004 | Miura ..................... F16B 37/00 |
| | | | 248/74.1 |
| 7,614,589 | B2 * | 11/2009 | Kato ..................... F16L 55/035 |
| | | | 248/74.1 |
| 7,802,761 | B2 * | 9/2010 | Volchko ................ F16L 55/035 |
| | | | 248/68.1 |
| 2024/0151327 | A1 * | 5/2024 | Matsumoto ............. F16L 3/223 |

FOREIGN PATENT DOCUMENTS

JP        2022-096576 A        6/2022

* cited by examiner

*Primary Examiner* — Anita M King
(74) *Attorney, Agent, or Firm* — Paratus Law Group, PLLC

(57) ABSTRACT

A holder for a long member includes: a holding member that includes a frame-shaped body portion; an anti-vibration member that is made of an elastic material and includes a frame-shaped portion; and a fixing member that is provided with an insertion portion. The insertion portion includes an extension portion extending in an insertion direction in which the insertion portion is inserted into the frame-shaped portion. A pressing protrusion protrudes on an outer surface of the extension portion, and when the frame-shaped portion is inserted into the frame-shaped body portion and the insertion portion is inserted into the frame-shaped portion, the pressing protrusion presses an inner surface of the frame-shaped portion and an outer surface of the frame-shaped portion comes into pressing contact with an inner surface of the frame-shaped body portion.

6 Claims, 22 Drawing Sheets

HOLDER FOR LONG MEMBER

CROSS-REFERENCE TO RELATED APPLICATIONS

This application is based on Japanese Patent Application No. 2022-177138 filed on Nov. 4, 2022, the contents of which are incorporated herein by way of reference.

TECHNICAL FIELD

The present invention relates to a holder for a long member that holds the long member with a line shape, a tubular shape, or a rod shape.

BACKGROUND

For example, pipes, tubes, wires, cables, harnesses, and the like are used in automobiles, but are entangled, interfere with other members, or are damaged in some cases. Therefore, such things are usually housed and held in some holders and are often arranged at predetermined positions inside vehicles via the holders.

For example, the following Patent Literature 1 discloses a holder that is fixed to a fixed member including a shaft member via the shaft member and holds a long member.

The holder for the long member includes a holding member that includes a frame-shaped body portion to which a holding portion for holding the long member is connected, an anti-vibration member that is made of an elastic material and includes a frame-shaped portion inserted into the frame-shaped body portion, and a fixing member that includes an insertion portion inserted into the frame-shaped portion and receives the shaft member, and that provided with a locking portion locked to the shaft member inside the insertion portion.

A first engagement portion is provided inside the frame-shaped body portion and a second engagement portion engaging with the first engagement portion is provided on an outer surface of the insertion portion. Further, a third engagement portion is provided inside the frame-shaped body portion and a fourth engagement portion engaging with the third engagement portion is provided on an outer surface of the frame-shaped portion. A push-in portion is provided on the base end side of the fixing member and an outer circumference of the push-in portion has a shape overhanging in a flange shape.

When each member of the holder is assembled, the frame-shaped portion is inserted into the frame-shaped body portion and the third engagement portion engages with the fourth engagement portion to attach the anti-vibration member to the holding member. Thereafter, the insertion portion is inserted into the frame-shaped portion and the first engagement portion engages with the second engagement portion to attach the fixing member to the holding member, so that the holder is assembled. When the holder is assembled, a flange of the fixing member faces an upper end surface of the frame-shaped body portion.

[Patent Literature 1] JP2022-96576A

Incidentally, when the long member is held by the holder as in Patent Literature 1 as described above, the long member is generally held to be substantially parallel or at a predetermined angle with respect to a fixed surface of the fixed member.

However, when a force that twists the long member, that is, a force that causes the long member to approach or move away from the fixed surface of the fixed member is applied, the flange of the fixing member and the upper end surface of the frame-shaped body portion may come into contact with each other and interfere with each other in some cases. Then, for example, vibration or the like occurring from the long member may be transmitted to the fixing member via the frame-shaped body portion, and thus anti-vibration performance of the anti-vibration member cannot be sufficiently achieved because the anti-vibration member is not involved.

Accordingly, an object of the present invention is to provide a holder for a long member that hinders the holding member and the fixing member from interfering with each other to sufficiently achieve anti-vibration performance of the anti-vibration member even when a force that twists the fixing member is applied.

SUMMARY

A holder for a long member is configured to be fixed to a fixed member including a shaft member via the shaft member and is configured to hold the long member. The holder includes: a holding member that includes a frame-shaped body portion to which a holding portion for holding the long member is connected; an anti-vibration member that is made of an elastic material and includes a frame-shaped portion configured to be inserted into the frame-shaped body portion; and a fixing member that is provided with an insertion portion configured to be inserted into the frame-shaped portion and configured to receive the shaft member, and a locking portion configured to be locked to the shaft member inside the insertion portion. The insertion portion includes an extension portion extending in an insertion direction in which the insertion portion is inserted into the frame-shaped portion. A pressing protrusion protrudes on an outer surface of the extension portion, and when the frame-shaped portion is inserted into the frame-shaped body portion and the insertion portion is inserted into the frame-shaped portion, the pressing protrusion presses an inner surface of the frame-shaped portion and an outer surface of the frame-shaped portion comes into pressing contact with an inner surface of the frame-shaped body portion.

DESCRIPTION OF EMBODIMENTS

First Embodiment of Holder for Long Member

Hereinafter, a first embodiment of a holder for a long member according to the present invention will be described with reference to FIGS. 1 to 18.

Figure 14:
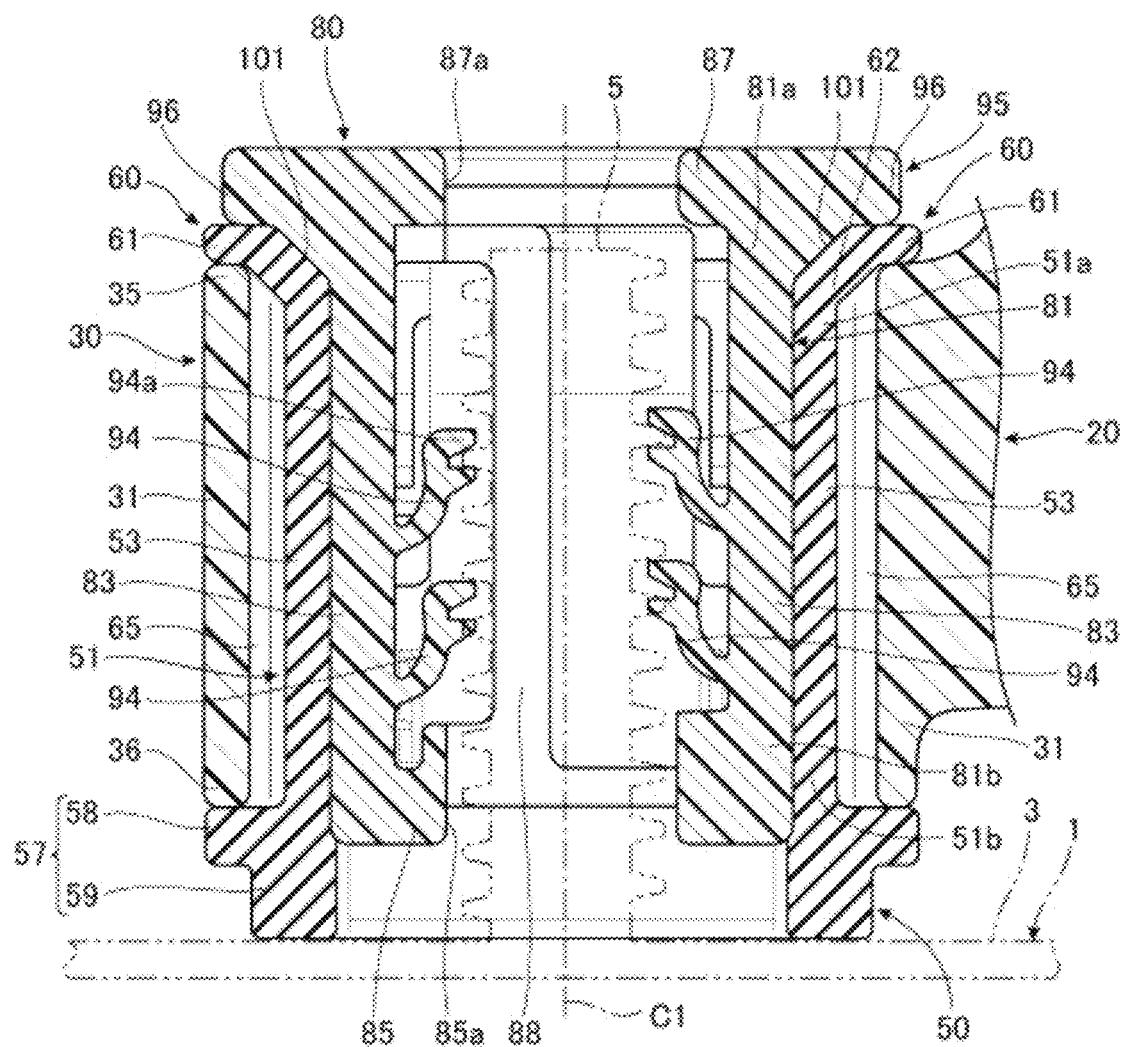
FIG. 14 is a sectional view taken along arrow line A-A of FIG. 2.

As illustrated in FIG. 14, a holder 10 for a long member in the embodiment (hereinafter simply referred to as the "holder 10") is fixed to a fixed member 1 including a shaft member 5 via the shaft member 5 and holds the long member P (see FIG. 12).

As illustrated in FIG. 14, in the embodiment, the shaft member 5 protrudes from a fixed surface 3 (meaning one-side portion of the fixed member 1 in a thickness direction and a surface on which the holder is disposed) of the fixed member 1 such as a vehicle body panel or a vehicle body frame.

Examples of the shaft member 5 include a so-called stud bolt that is erected integrally or separately from the fixed surface 3 and has an external circumferential surface with a screw groove. An axial direction (meaning a direction along an axial center C1 of the shaft member 5 illustrated in FIG. 14) of the shaft member 5 in the embodiment is orthogonal to a planar direction of the fixed surface 3. The shaft member 5 is not limited to the stud bolt, and may be, for example, a columnar member with a prismatic shape or a cylindrical shape or may engage with a fixing portion (which will be described below) of a fixing member 80.

The long member P is, for example, a member with a line shape, a tubular shape, or a rod shape, such as a pipe, a tube, a hose, a rod, a wire, a cable, a harness, or a cord.

Figure 1:
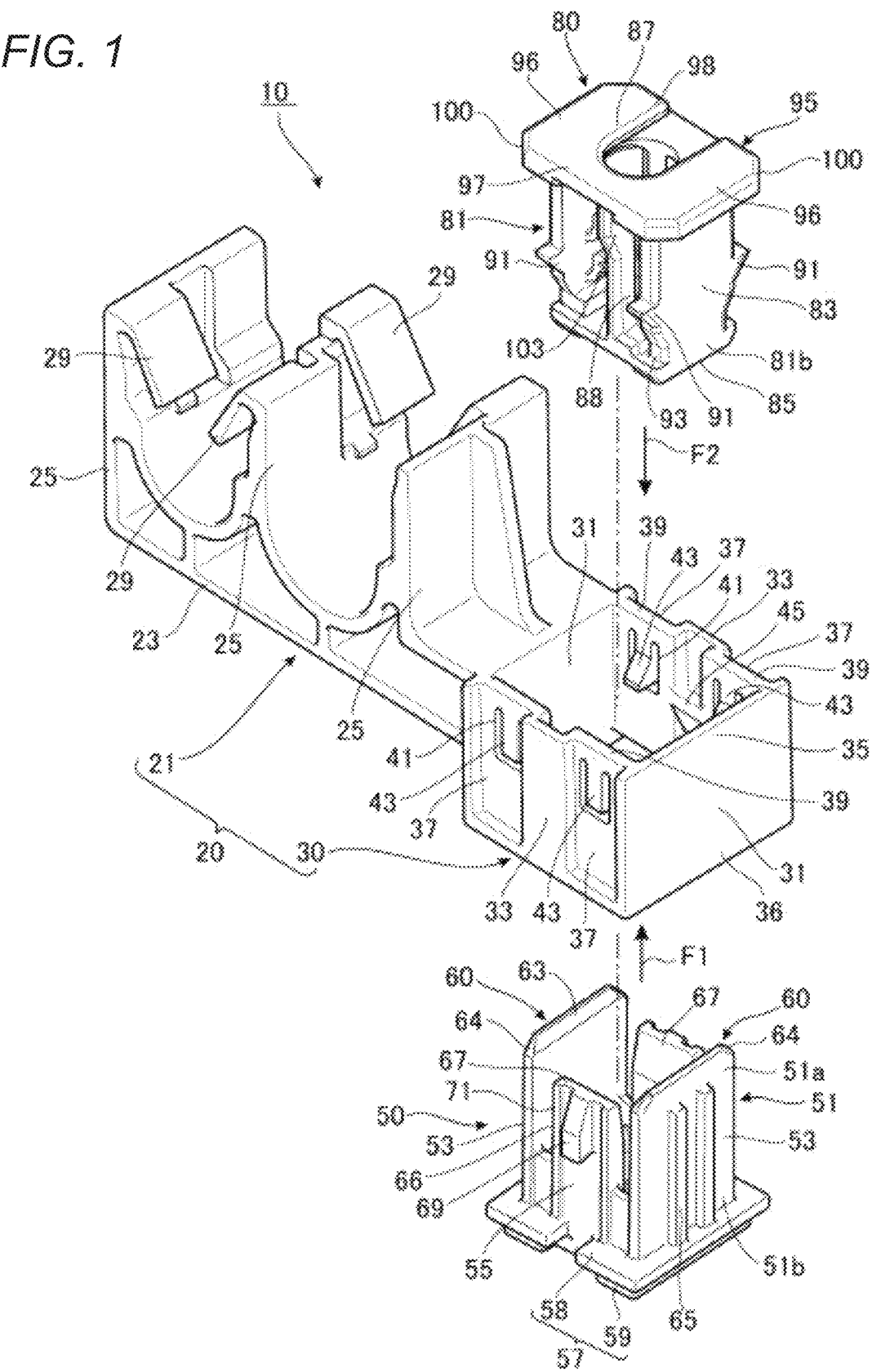
FIG. 1 is an exploded perspective view illustrating a first embodiment of a holder for a long member according to the present invention.

As illustrated in FIG. 1, the holder 10 mainly includes a holding member 20 that includes a holding portion 21 and a frame-shaped body portion 30, an anti-vibration member 50 that includes a frame-shaped portion 51, and a fixing member 80 that is provided with an insertion portion 81, locking portions 94, and a flange 95.

The frame-shaped portion 51 is inserted into the frame-shaped body portion 30 and the insertion portion 81 is inserted into the frame-shaped portion 51, so that the anti-vibration member 50 and the fixing member 80 are assembled in the holding member 20 as illustrated in FIGS. 14 to 17.

In the following description, an insertion direction in which the frame-shaped portion 51 is inserted into the frame-shaped body portion 30 is also referred to as a "frame-shaped portion insertion direction F1," as indicated by an arrow F1 of FIG. 1. An insertion direction in which the insertion portion 81 is inserted into the frame-shaped portion 51 is also referred to as an "insertion portion insertion direction F2," as indicated by an arrow F2 of FIG. 1.

Figure 6:
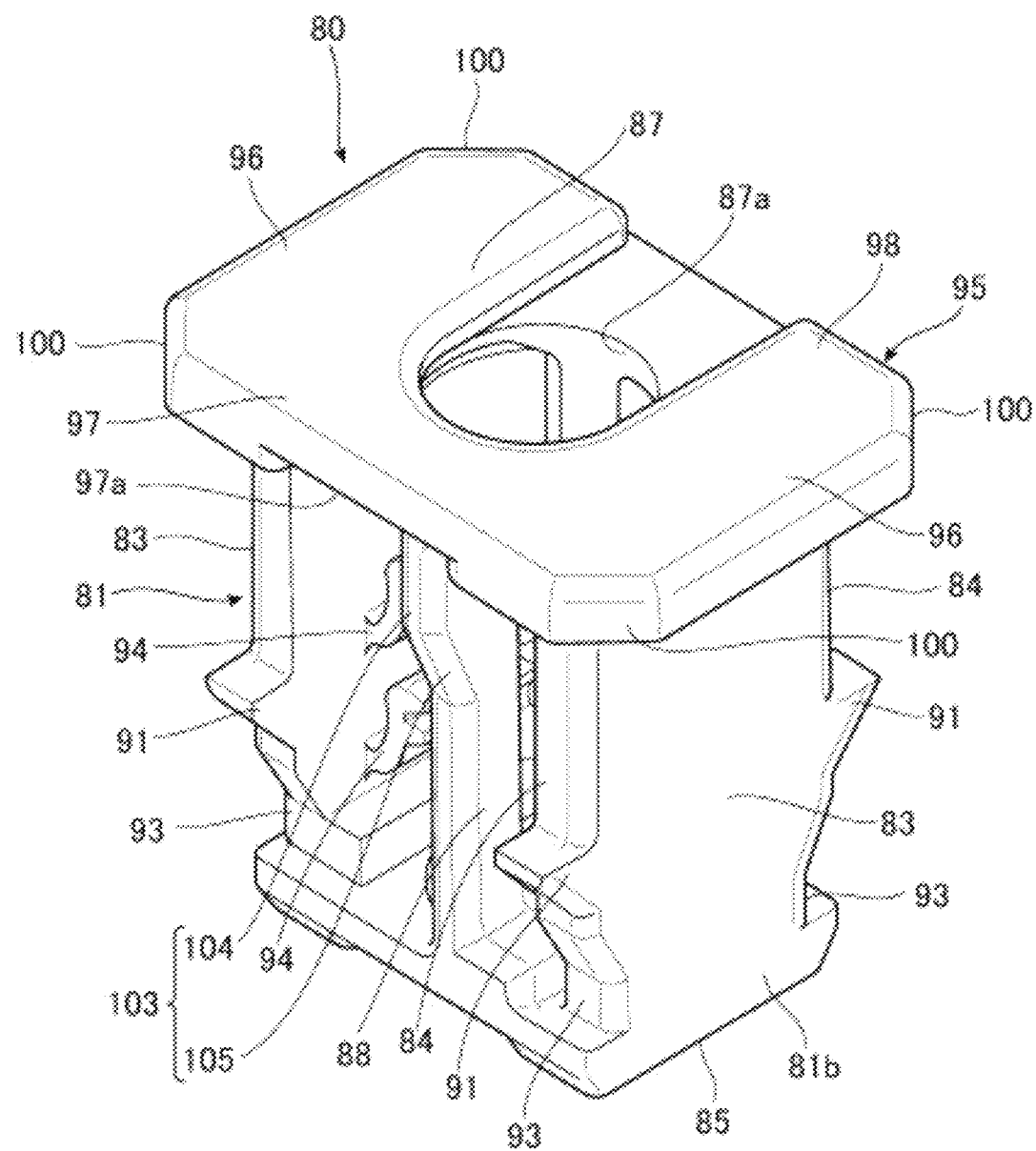
FIG. 6 is an enlarged perspective view illustrating a fixing member included in the holder for the long member according to the present invention.
Figure 7:
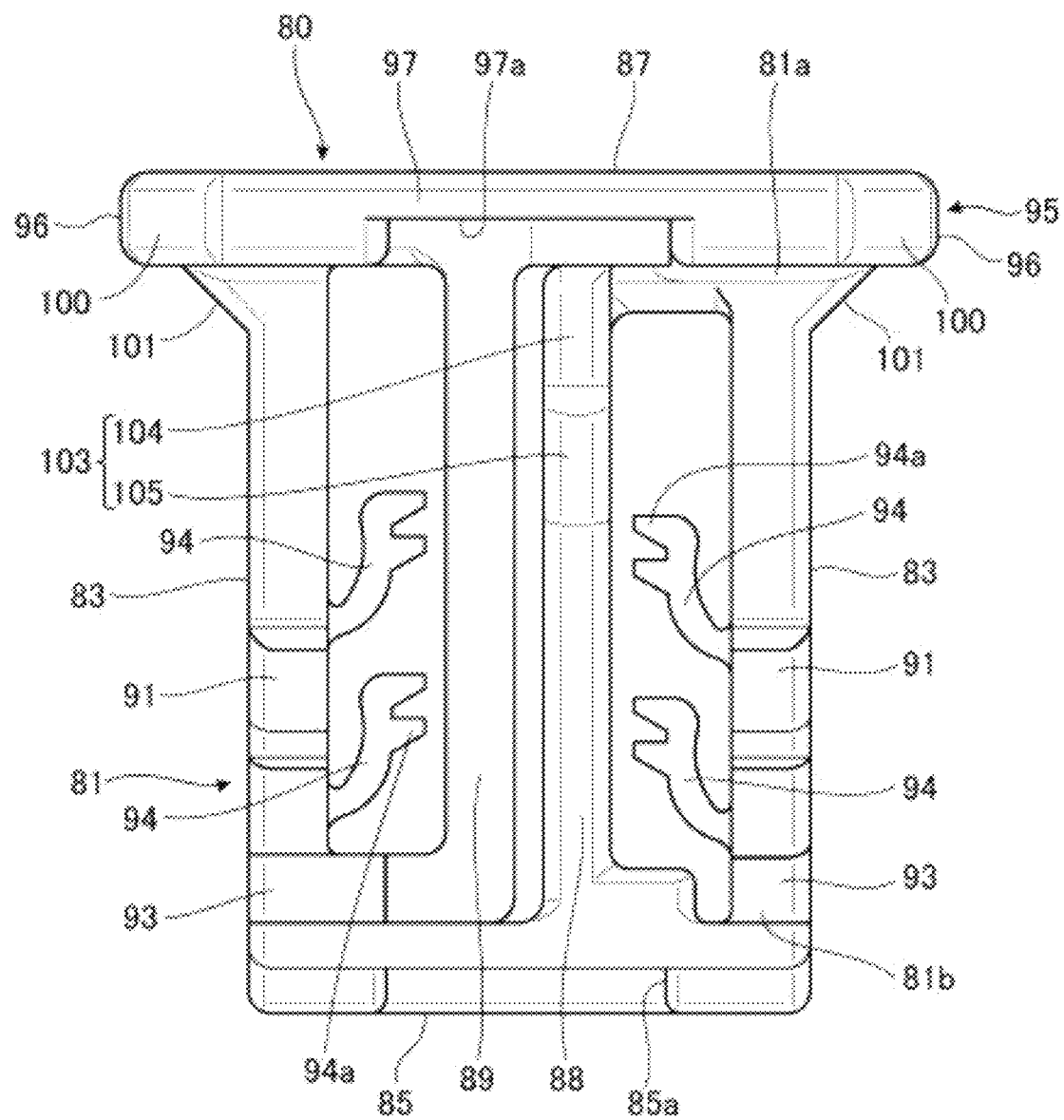
FIG. 7 is a side view illustrating the fixing member.
Figure 8:
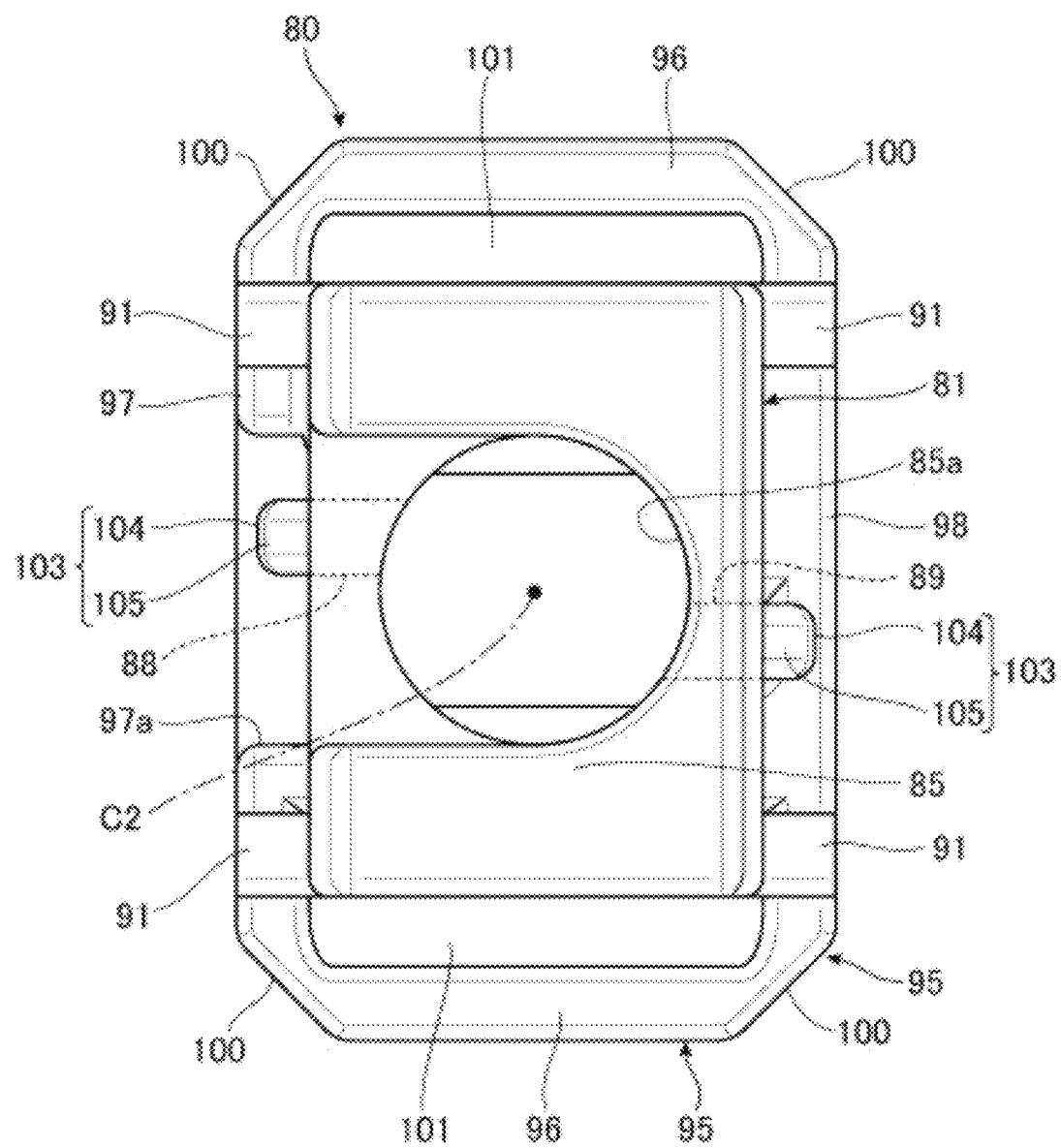
FIG. 8 is a bottom view illustrating the fixing member.

As illustrated in FIGS. 6 to 8, the insertion portion 81 includes extension portions (in the embodiment, a pair of second extension portions 88 and 89) extending in the insertion direction in which the insertion portion 81 is inserted into the frame-shaped portion 51 (the insertion portion insertion direction F2).

Further, pressing protrusions 103, 103 protrude on outer surfaces of the pair of second extension portions 88 and 89. When the frame-shaped portion 51 is inserted into the frame-shaped body portion 30 and the insertion portion 81 is inserted into the frame-shaped portion 51, the pressing protrusions 103, 103 press an inner surface of the frame-shaped portion 51 and an outer surface of the frame-shaped portion 51 (here, an outer surface of a second protrusion ridge 71) comes into pressing contact with an inner surface of the frame-shaped body portion 30 (see FIGS. 15 and 17). In the case of the embodiment, the pressing protrusions 103, 103 protrude in portions opposite to the insertion direction (the insertion portion insertion direction F2) on the outer surfaces of the pair of second extension portions 88 and 89.

Engaged portions (here, second engagement portions 45) are provided on the inner surface of the frame-shaped body portion 30. Further, engagement portions (here, third engagement portions 69) engaging with the engaged portions when the frame-shaped portion 51 is inserted into the frame-shaped body portion 30 are provided on the outer surface of the frame-shaped portion 51, and the pressing protrusions 103 press locations which are fitted at positions at which the engagement portions are provided on the inner surface of the frame-shaped portion 51 (FIG. 15).

An assembly state of the anti-vibration member 50 and the fixing member 80 in the holding member 20 is a state where the frame-shaped portion 51 is inserted into the frame-shaped body portion 30 up to a maximum insertion position and the insertion portion 81 is inserted into the frame-shaped portion 51 up to a maximum insertion position.

Figure 15:
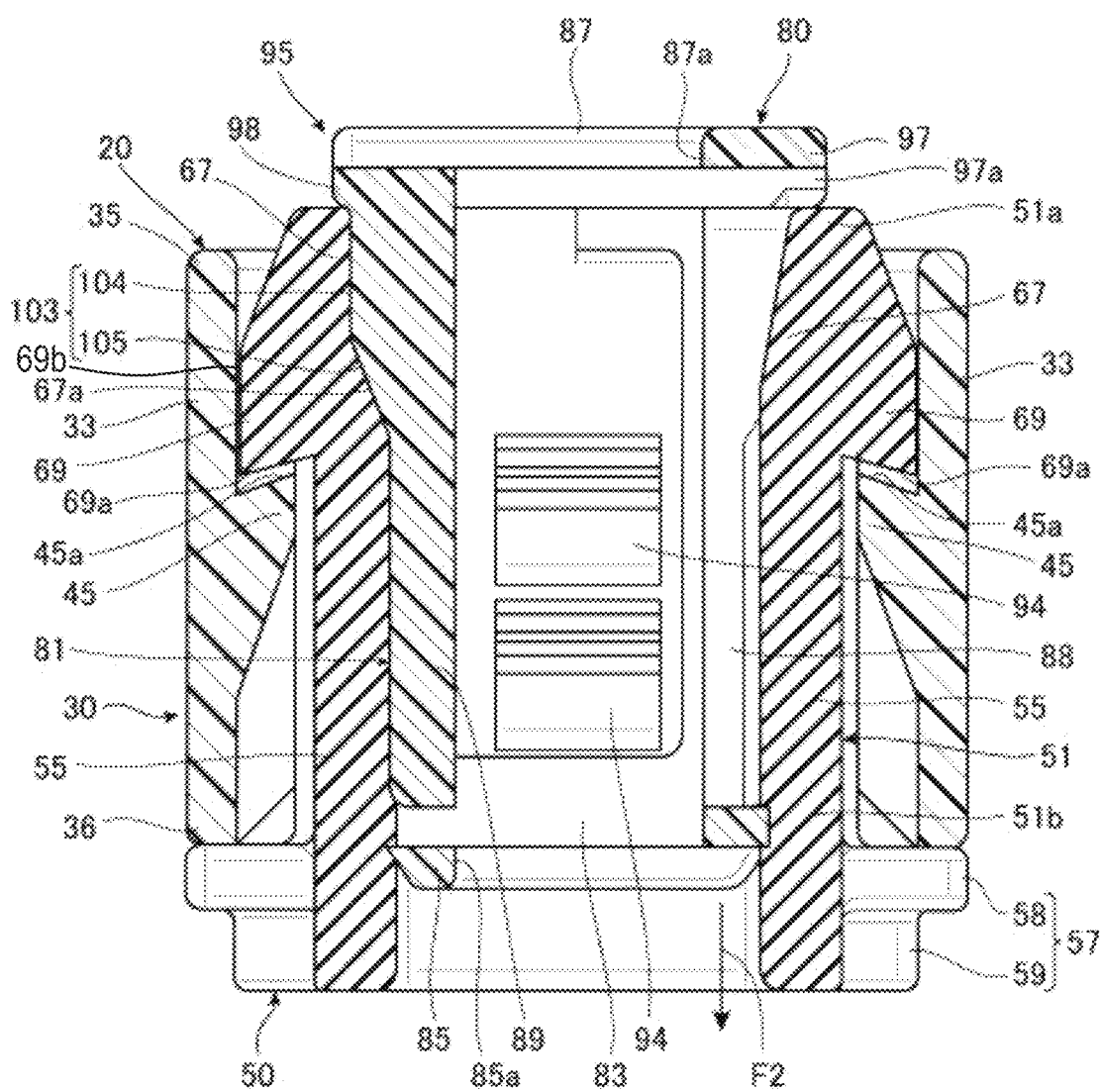
FIG. 15 is a sectional view taken along arrow line B-B of FIG. 2.

Further, as illustrated in FIG. 15, the second engagement portions 45 are provided in the frame-shaped body portion 30 of the holding member 20, and the third engagement portions 69 are provided in the frame-shaped portion 51 of the anti-vibration member 50. When the frame-shaped portion 51 is inserted into the frame-shaped body portion 30 from the side of the fixed member 1, as indicated by the arrow F1 of FIG. 1, the second engagement portions 45 and the third engagement portions 69 can engage with each other and the anti-vibration member 50 is assembled in the holding member 20, as illustrated in FIG. 15.

Figure 16:
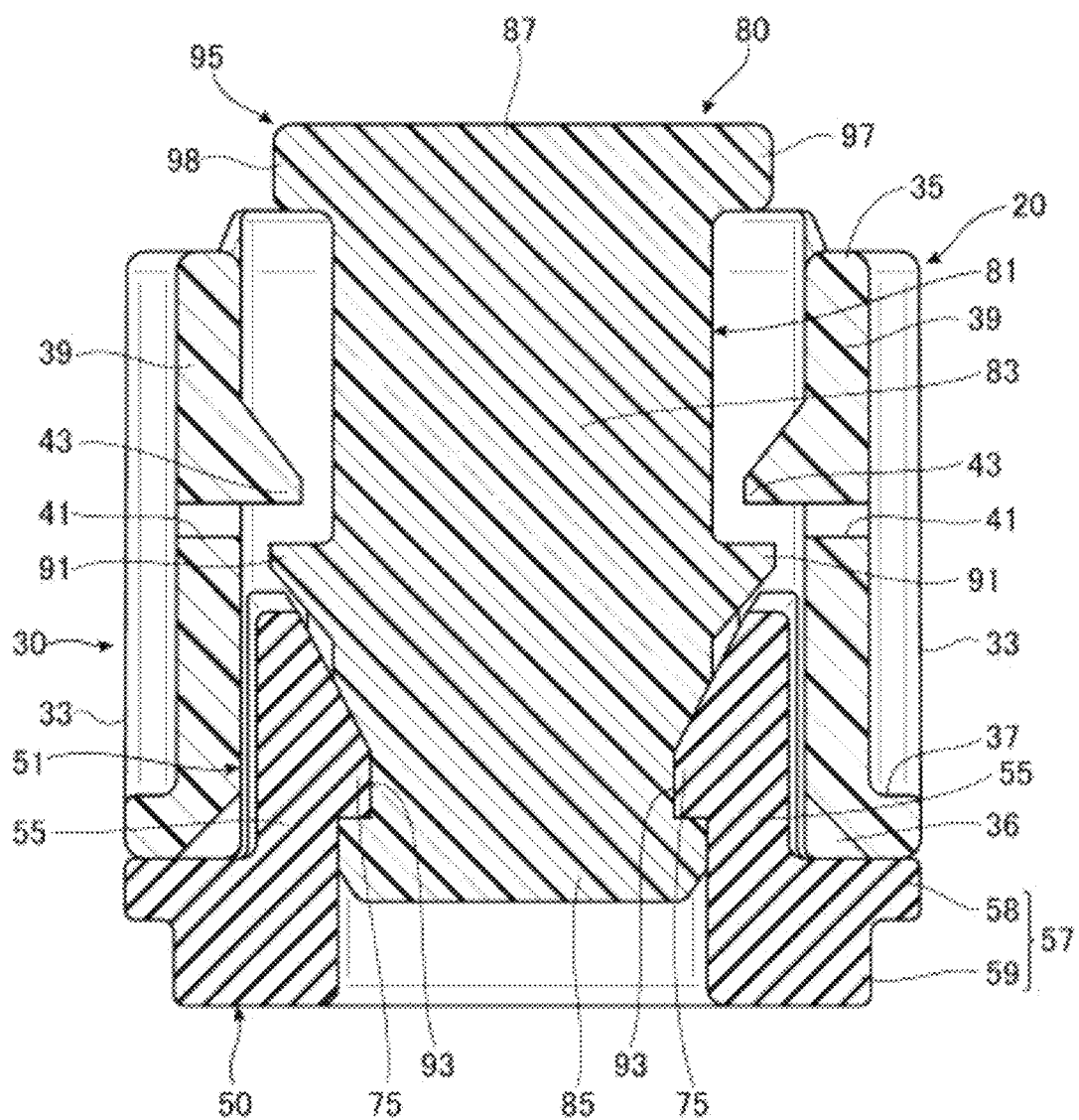
FIG. 16 is a sectional view taken along arrow line D-D of FIG. 2.

As illustrated in FIG. 16, first engagement portions 43 are provided in the frame-shaped body portion 30 of the holding member 20, and fifth engagement portions 91 are provided in the insertion portion 81 of the fixing member 80. Further, fourth engagement portions 75 are provided in the frame-shaped portion 51 of the anti-vibration member 50 and sixth engagement portions 93 are provided in the insertion portion 81 of the fixing member 80.

When the insertion portion 81 is inserted into the frame-shaped portion 51 from an opposite side to the fixed member 1, as indicated by the arrow F2 of FIG. 1, the first engagement portions 43 and the fifth engagement portions 91 face each other and can engage with each other, and the fourth engagement portions 75 and the sixth engagement portions 93 engage with each other, as illustrated in FIG. 16, so that the fixing member 80 is assembled in the anti-vibration member 50.

Next, each member included in the holder 10 will be described.

First, the holding member 20 will be described with reference to FIGS. 1 to 3 and 14 to 17, and the like. As illustrated in FIG. 1, the holding member 20 includes the frame-shaped body portion 30 connected to the holding portion 21 that holds the long member P.

The frame-shaped body portion 30 in the embodiment includes a pair of walls 31, 31 that face each other in parallel and a pair of walls 33, 33 which are orthogonal to the pair of walls 31, 31 and face each other, and has a substantially quadrangular frame shape in which one end 35 side and the other end 36 side are opened.

The one end 35 side of the frame-shaped body portion 30 is a side away from the fixed member 1 and the other end 36 side of the frame-shaped body portion 30 is a side opposite to the one end 35 side and close to the fixed member 1 (a side facing the fixed surface 3 of the fixed member 1). The same also applies to "one end side" or "the other end side" in each portion (the frame-shaped portion 51 or the like) of the anti-vibration member 50 or each portion (the insertion portion 81 or the like) of the fixing member 80 to be described below, or the foregoing shaft member 5.

The frame-shaped portion 51 is inserted from an opening on the other end 36 side of the frame-shaped body portion 30.

A pair of recessed portions 37 that has a recessed groove shape at a predetermined depth from the outer surface are formed on both sides in the width direction (a direction orthogonal to an arrangement direction of the pair of walls 33, 33) and on a side of the outer surface of each wall 33 (a surface opposite to the inner surface of the frame-shaped body portion 30 oriented inward) (see FIG. 1). Each recessed portion 37 is opened on the one end 35 side of the frame-shaped body portion 30 and is closed on the other end 36 side, and extends with a given width from the one end 35 side to the other end 36 side.

Figure 2:
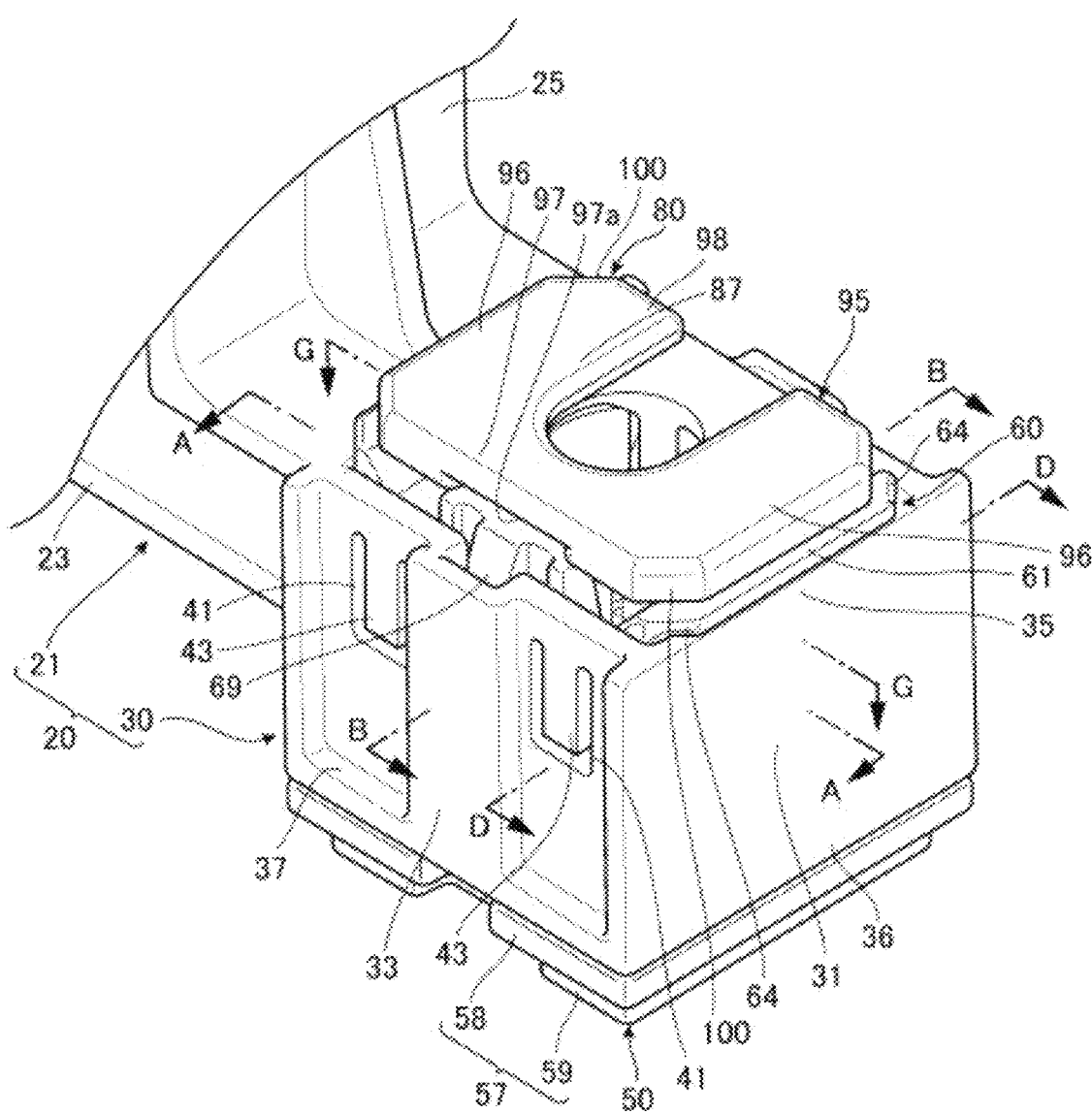
FIG. 2 is a perspective view illustrating assembled main portions of the holder.
Figure 3:
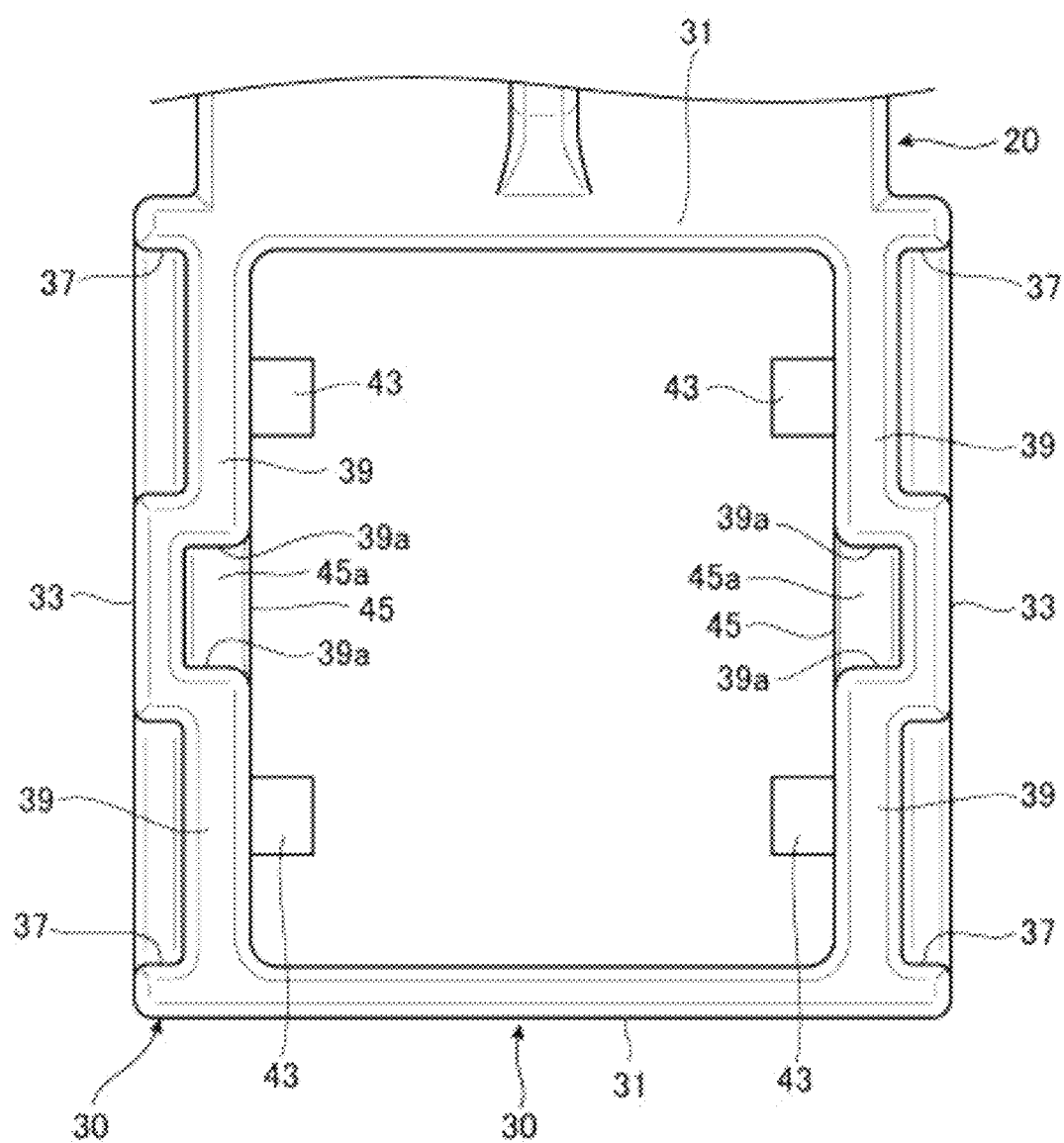
FIG. 3 is an enlarged plan view illustrating main portions of a frame-shaped body portion of a holding member included in the holder.

Further, as illustrated in FIG. 3, a pair of protrusions 39 protrude inwards from the frame-shaped body portion 30 at positions corresponding to the pair of recessed portions 37 of each wall 33. In each protrusion 39, a first engagement portion 43 that is bendable and deformable is provided via a U-shaped slit 41 (see FIG. 2). In the frame-shaped body portion 30 in the embodiment, four first engagement portions 43 are provided (see FIG. 3).

In each first engagement portion 43, a fixing end is connected to the one end 35 side of the frame-shaped body portion 30 and a free end is disposed on the other end 36 side of the frame-shaped body portion 30. The free end protrudes on the inner side of the frame-shaped body portion 30. The first engagement portion 43 faces the fifth engagement portion 91 provided in the fixing member 80 and can engage with the fifth engagement portion 91 (see FIG. 16).

As illustrated in FIG. 3, the second engagement portion 45 is provided at a portion between facing inner surfaces 39a of the pair of protrusions 39 provided in each wall 33. As illustrated in FIG. 15, a surface 45a of the second engagement portion 45 on the one end 35 side of the frame-shaped body portion 30 (hereinafter also simply referred to as "one end surface 45a") has a tapered shape in which a protrusion amount gradually increases toward the inner side of the frame-shaped body portion 30 and toward the one end 35 side of the frame-shaped body portion 30.

The second engagement portion 45 can engage with the third engagement portion 69 provided in the anti-vibration member 50 (see FIG. 15). The second engagement portion 45 serves as an "engaged portion" in the present invention.

On the other hand, the holding portion 21 is consecutively connected to one wall 31 side of the pair of walls 31, 31 included in the frame-shaped body portion 30.

Figure 10:
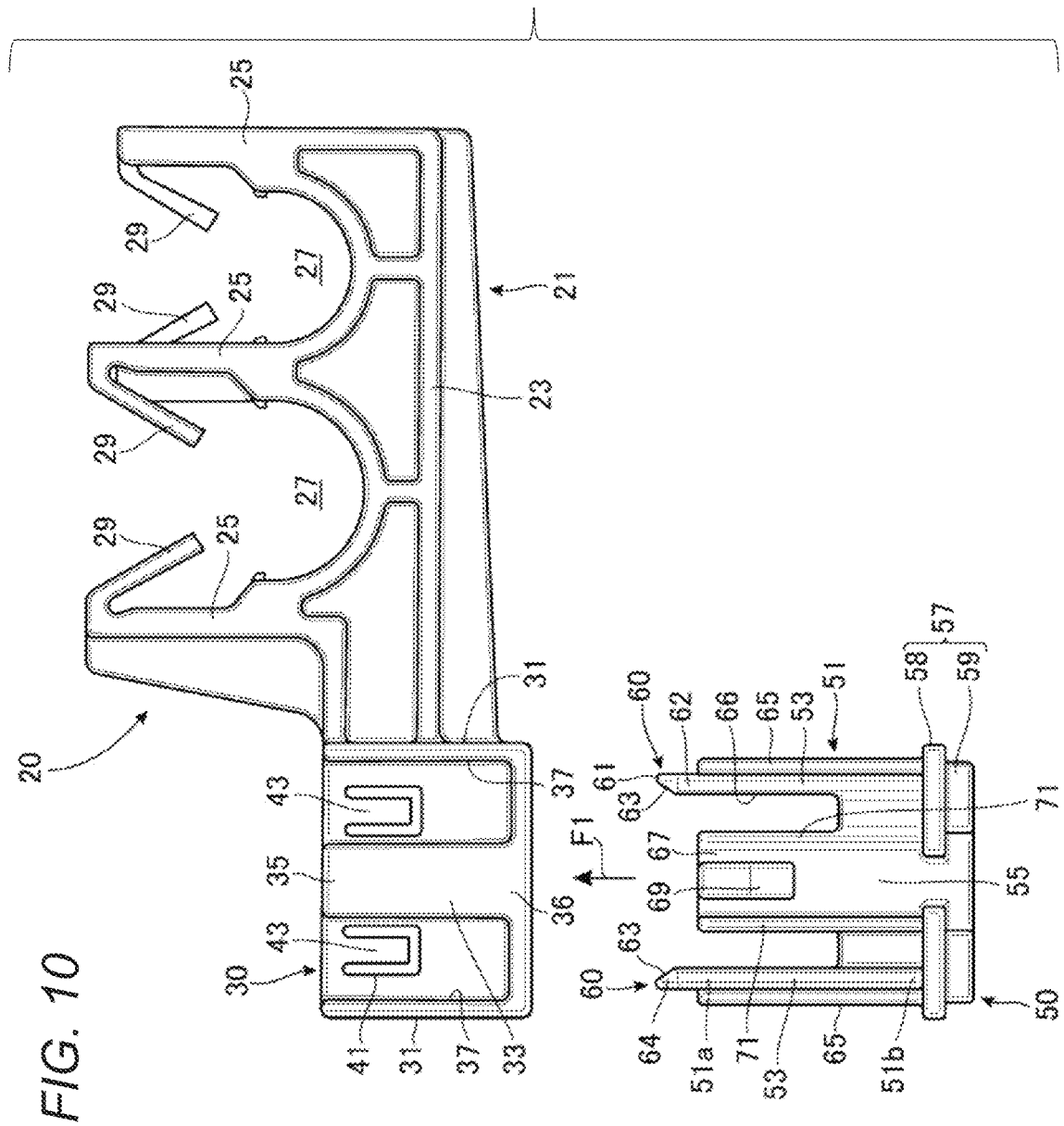
FIG. 10 is a diagram illustrating a first process in an assembly process of each member in the holder for the long member according to the present invention.

As illustrated in FIGS. 1 and 10, the holding portion 21 includes a bottom wall 23 that extends by a predetermined length in a direction orthogonal to an axial direction of the frame-shaped body portion 30 from a location of the wall 31 on the fixed surface 3 side, and a plurality of holding walls 25 that extend in the axial direction of the frame-shaped body portion 30 at a predetermined interval from the bottom wall 23.

As illustrated in FIG. 10, a plurality of holding spaces 27 are defined by the bottom wall 23 and the plurality of holding walls 25 to hold the long member P. Further, a plurality of holding claws 29 extend inwards slantly toward the bottom wall 23 from the inner surface of each holding wall 25 (a surface facing the holding space 27 side). As a result, a plurality of the long members P can be retained and held in the plurality of holding spaces 27.

Next, the anti-vibration member 50 will be described with reference to FIGS. 4, 5, 10, 14 to 17, and the like.

As illustrated in FIG. 1, the anti-vibration member 50 is made of an elastic material and includes the frame-shaped portion 51 inserted into the inner side of the frame-shaped body portion 30 from the fixed member 1 side. The frame-shaped portion 51 includes a wall 53 in which an extension piece 60 is provided.

Figure 4:
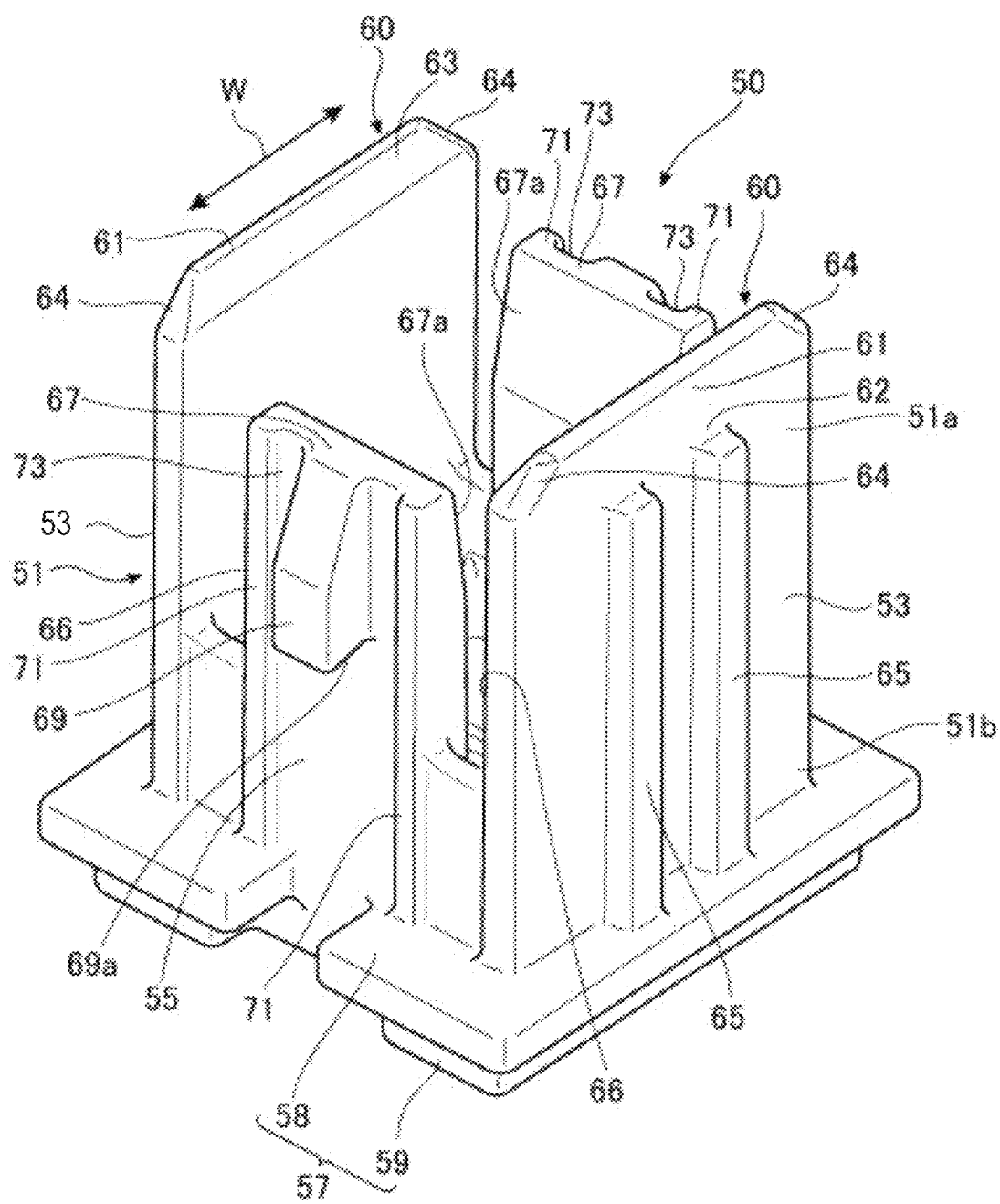
FIG. 4 is an enlarged perspective view illustrating an anti-vibration member included in the holder.
Figure 5:
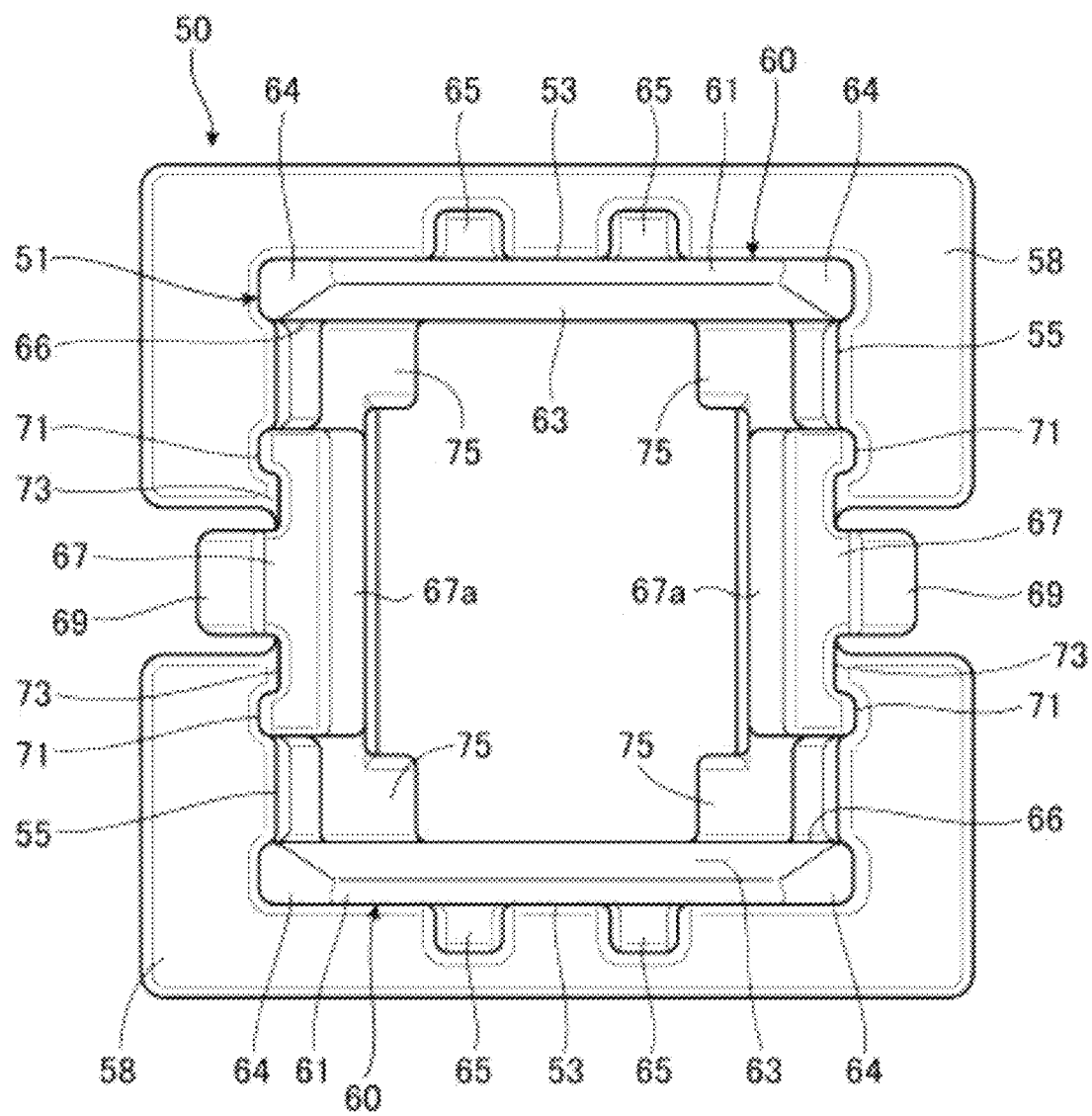
FIG. 5 is a plan view illustrating the anti-vibration member.

Referring together to FIGS. 4 and 5, the frame-shaped portion 51 in the embodiment includes a pair of walls 53, 53 facing each other in parallel and a pair of walls 55, 55 facing each other and orthogonal to the pair of walls 53, 53, and has a substantially quadrangular frame shape in which one end 51a side and the other end 51b side of the frame-shaped portion 51 are opened. The frame-shaped portion 51 is inserted into the frame-shaped body portion 30 from the one end 51a side and the insertion portion 81 of the fixing member 80 is inserted from an opening of the one end 51a side.

The frame-shaped portion 51 with a substantially quadrangular frame shape has a shape similar to and smaller than the frame-shaped body portion 30 with a substantially quadrangular frame shape.

Specifically, a width (a length in a direction orthogonal to an arrangement direction of the pair of walls 53, 53) of each wall 53 of the frame-shaped portion 51 is smaller than a width (a length in a direction orthogonal to an arrangement direction of the pair of walls 31, 31) of each wall 31 of the frame-shaped body portion 30. Further, the width (the length in the direction orthogonal to the arrangement direction of the pair of walls 53, 53) of each wall 53 of the frame-shaped portion 51 is smaller than a width (a length in the direction orthogonal to the arrangement direction of the pair of walls 33, 33) of each wall 33 of the frame-shaped body portion 30.

As a result, the frame-shaped portion 51 can be inserted into the frame-shaped body portion 30. In the insertion state, there is a predetermined gap between an entire inner circumference of the frame-shaped body portion 30 and an entire outer circumference of the frame-shaped portion 51.

A length (a length in the frame-shaped portion insertion direction F1) of the pair of walls 55, 55 included in the frame-shaped portion 51 is shorter than a length of the pair of walls 53, 53 in which the extension pieces 60 are provided. Here, as illustrated in FIG. 12, in a state where the frame-shaped portion 51 is inserted into the frame-shaped body portion 30, a portion of the wall 55 on the one end 51a side protrudes by a predetermined length from an opening of the frame-shaped body portion 30 on the one end 35 side.

Further, in the frame-shaped portion 51, a contact portion 57 that protrudes further than the other end 36 of the frame-shaped body portion 30 and comes into contact with the fixed member 1 is provided on the other end 51b side. The contact portion 57 includes a flange 58 with a thin plate shape that is overhung outwards from the outer circumference of the frame-shaped portion 51 on the other end 51b side and a pedestal 59 that protrudes from the surface of the flange 58 on the other end 51b side.

As indicated by the frame-shaped portion insertion direction F1 in FIG. 1, when the frame-shaped portion 51 is inserted into the frame-shaped body portion 30 from the fixed member 1 side to assemble the anti-vibration member 50 in the holding member 20, the flange 58 of the contact portion 57 of the frame-shaped portion 51 comes into contact with the end surface of the frame-shaped body portion 30 on the other end 36 side (see FIG. 11 or the like) so that the maximum insertion position of the frame-shaped portion 51 to be inserted into the frame-shaped body portion 30 is regulated. The pedestal 59 is a portion coming into contact with the fixed surface 3 of the fixed member 1 (see FIGS. 12 and 14).

The anti-vibration member 50 includes the extension pieces 60 that extend to protrude from the frame-shaped body portion 30 (see FIG. 11) in a state where the frame-shaped portion 51 is inserted into the frame-shaped body portion 30, and are pressed to be able to be curved outwards (see FIG. 12) by the flange 95 of the fixing member 80 or a part (in the embodiment, pressing surfaces 101 to be described below) of the insertion portion 81 when the insertion portion 81 is inserted into the frame-shaped portion 51 in this state, as indicated by the insertion portion insertion direction F2 in FIG. 1.

As the extension pieces 60 will be described more specifically, each of the extension pieces 60, 60 extends from one end of each of the pair of walls 53, 53 included in the frame-shaped portion 51 (ends of the frame-shaped portion 51 on the one end 51a side).

Each extension piece 60 extends integrally and continuously from one end of the wall 53 to the wall 53 and extends straight to the wall 53 before the frame-shaped portion 51 is inserted into the frame-shaped body portion 30. Further, the extension piece 60 extends long further than the end of the wall 55 on the one end 51a side before the frame-shaped portion 51 is inserted into the frame-shaped body portion 30.

As illustrated in FIG. 4 or 10, a tapered surface 63 in which the thickness of the extension piece 60 is gradually thinned toward the forefront end of the extension piece 60 is formed at a distal end 61 (also referred to as one end of the extension piece 60) in an extension direction of each extension piece 60 on the inner surface side of the distal end 61 (as illustrated in FIG. 3, an inward surface of the frame-shaped body portion 30 before the frame-shaped portion 51 is inserted into the frame-shaped body portion 30) side. Further, the pair of extension pieces 60, 60 protrude from the opening of the frame-shaped body portion 30 on the one end 35 side in the state where the frame-shaped portion 51 is inserted into the frame-shaped body portion 30 (see FIG. 11).

Figure 12:
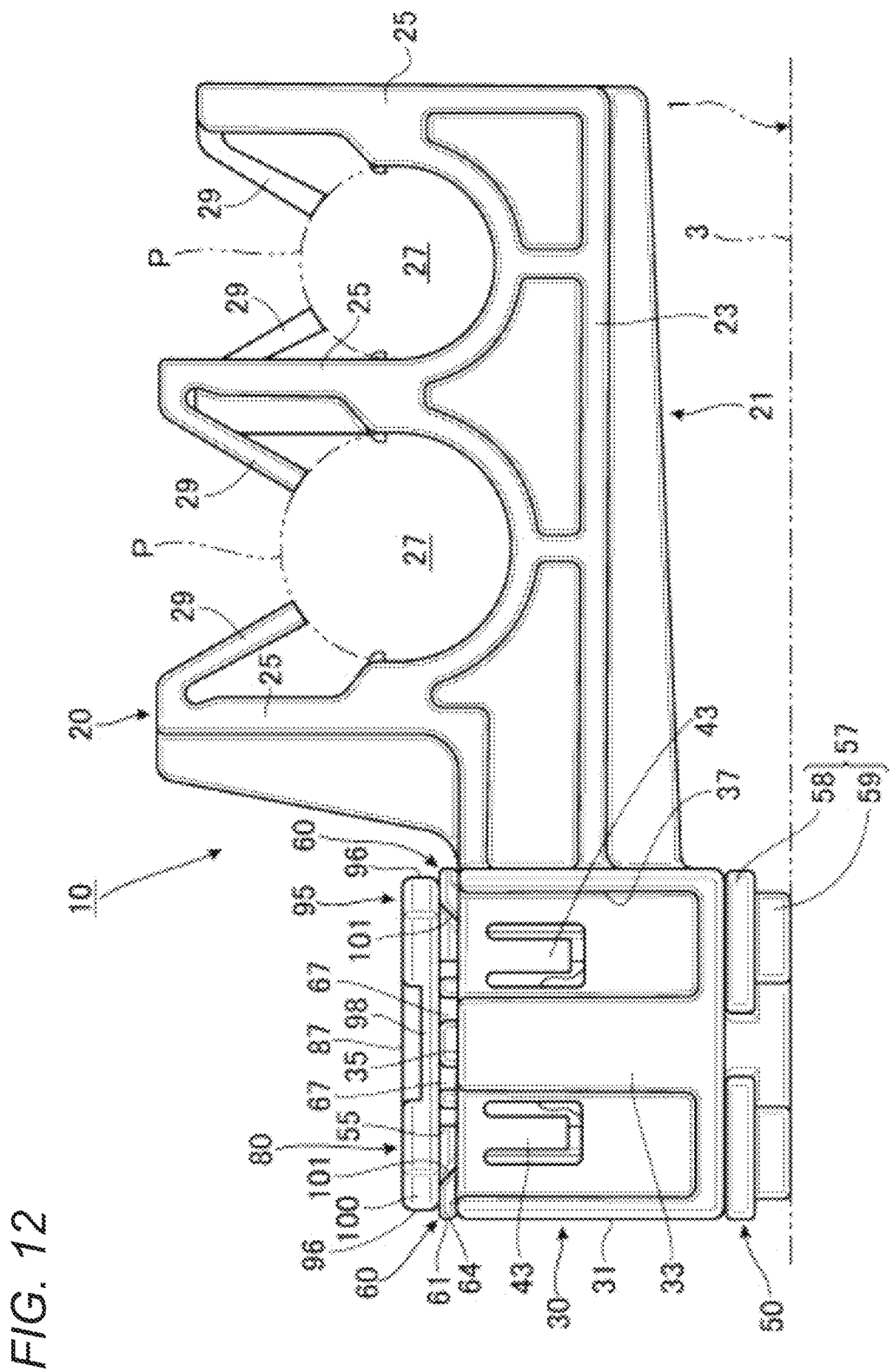
FIG. 12 is a diagram illustrating a third process in the assembly process.

The distal end 61 of each extension piece 60 is pressed by the flange 95 of the fixing member 80 or a part (the pressing surface 101) of the insertion portion 81, so that the pair of extension pieces 60, 60 are curved and deformed outwards and the distal ends 61, 61 are separated from each other with a base end (also referred to as the other end and indicating a connection portion or a boundary portion with the one end of the wall 53) of each extension piece 60 as a starting point (see FIG. 12).

In the state where the pair of extension pieces 60 are pressed apart, as illustrated in FIG. 14, the outer surfaces (surfaces opposite to the inner surface) of the distal ends 61 of the extension pieces 60 come into contact with the ends of the pair of walls 31, 31 included in the frame-shaped body portion 30 on the one end 35 side and the flanges 95 (here, first flanges 96) come into contact with and are placed on the inner surfaces of the distal ends 61 of the extension pieces 60.

That is, in a state where the frame-shaped portion 51 is inserted into the frame-shaped body portion 30 and the insertion portion 81 is inserted into the frame-shaped portion 51, and the anti-vibration member 50 and the fixing member 80 are assembled in the holding member 20, the distal ends 61 of the extension pieces 60 are sandwiched between the frame-shaped body portion 30 and the flanges 95.

As illustrated in FIG. 4, both sides of the distal end 61 of each extension piece 60 in a width direction W are notched as extension piece-side tapered portions 64, 64 and the width of the distal end 61 is narrowed. The width direction W of the extension piece 60 is a direction orthogonal to the thickness direction and the extension direction of the extension piece 60.

On the outer surface of the wall 53, first protrusion ridges 65 which are protrusion ridges extending in the extension direction and coming into contact with the inner surface of the frame-shaped body portion 30 are formed with a length which does not reach the distal end 61 (one end) of the extension piece 60.

In the embodiment, in the intermediate portion of the outer surface (a surface opposite to the inner surface of the frame-shaped portion 51 oriented inward) of each wall 53 in the width direction, the pair of first protrusion ridges 65 extend in parallel to each other in the extension direction of the wall 53. Each first protrusion ridge 65 extends by a length in which the other end is connected to the flange 58 included in the contact portion 57 and one end does not reach the base end of the extension piece 60.

Figure 17:
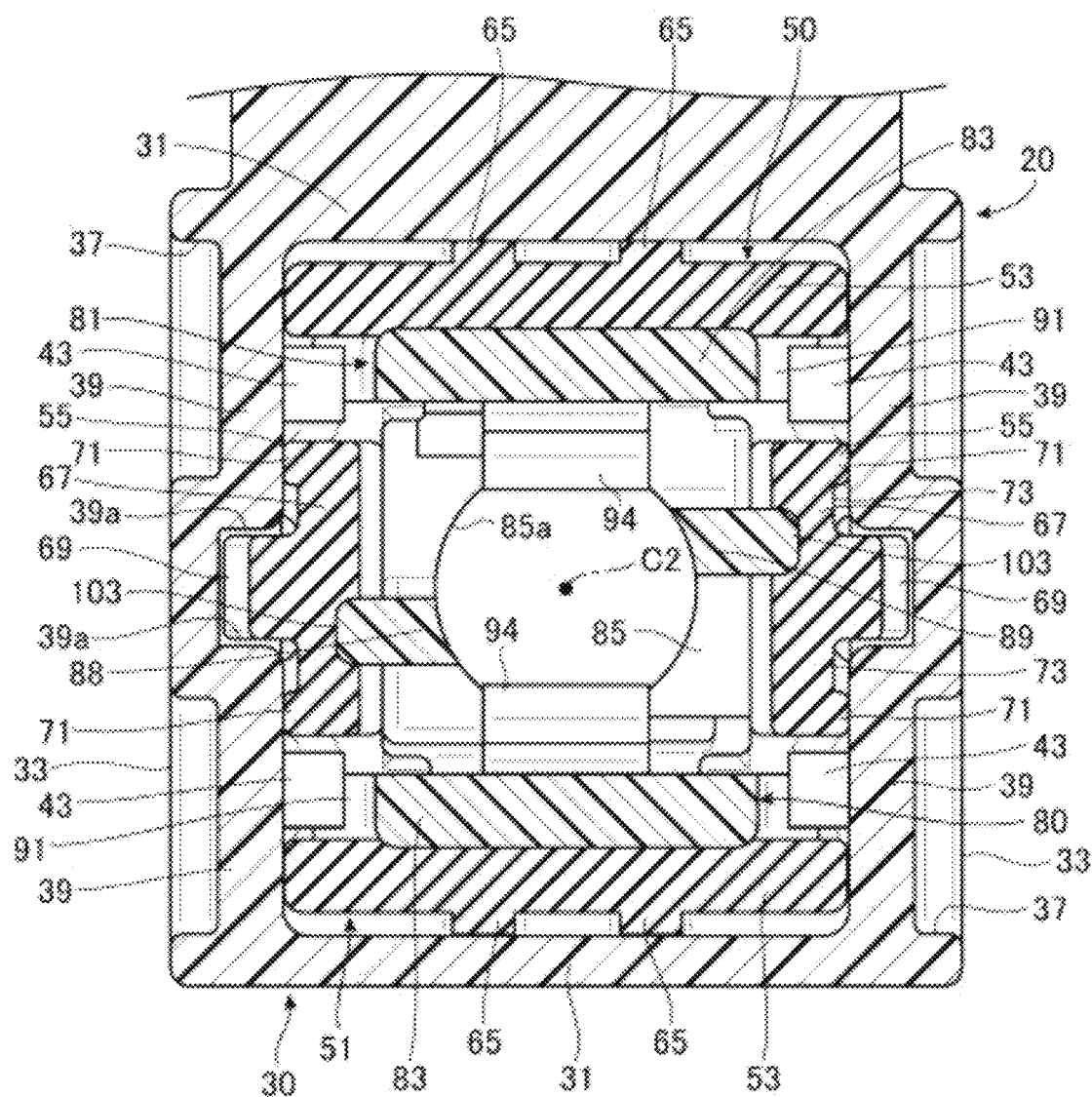
FIG. 17 is a sectional view taken along arrow line G-G of FIG. 2.

When the frame-shaped portion 51 is inserted into the frame-shaped body portion 30, as illustrated in FIG. 17, the first protrusion ridge 65 comes into contact (also comes into pressing contact) with the inner surface of the wall 31 included in the frame-shaped body portion 30.

Within a predetermined range which reaches the base end (the other end) side from the distal end (one end) of each wall 55 in the extension direction, a pair of slits 66, 66 extending in parallel to each other are formed, and each of bendable and deformable elastic pieces 67 is formed via the pair of slits 66, 66. As illustrated in FIG. 4, on the inner surface (an inward surface of the frame-shaped portion 51) of the distal end (one end) of each elastic piece 67, each tapered surface 67a in which the elastic piece 67 is gradually thinned toward the one end 51a of the frame-shaped portion 51 is formed.

Further, the third engagement portion 69 protrudes at the distal end of each elastic piece 67 in the intermediate portion of the outer surface (the surface opposite to the inner surface) of the distal end in the width direction. As illustrated in FIG. 15, a surface 69a of the third engagement portion 69 (hereinafter also simply referred to as "the other end surface 69a") facing the other end 51b side of the frame-shaped portion 51 has a so-called inverted tapered shape in which a protrusion amount gradually increases toward the outside of the frame-shaped portion 51 and toward the other end 51b side of the frame-shaped portion 51.

The other end surface 69a of the third engagement portion 69 faces the one end surface 45a of the second engagement portion 45 provided in the frame-shaped body portion 30 (see FIG. 15), and the third engagement portion 69 can engage with the second engagement portion 45. The third engagement portion 69 provided on the outer surface of the elastic piece 67 serves as an "engagement portion" in the present invention.

A location which is fitted at a position at which the third engagement portion 69 is provided on the inner surface of the elastic piece 67 (one member included in the frame-shaped portion 51) formed on the wall 55 of the frame-shaped portion 51, that is, a location which is fitted in the third engagement portion 69 in the axial direction of the frame-shaped body portion 30 or the frame-shaped portion 51 (the tapered surface 67a of the inner surface of the distant end of the elastic piece 67), is pressed by the pressing protrusion 103 (see FIG. 15).

Further, as illustrated in FIG. 15, in the third engagement portion 69, a portion protruding most from the outer surface of the wall 55 serves as an apex 69b of the third engagement portion 69. In a state where the inner surface of the elastic piece 67 is pressed by the pressing protrusion 103, the apex 69b of the third engagement portion 69 is close to and is slightly separated from the inner surface of the wall 33 included in the frame-shaped body portion 30 (see FIG. 15).

The slits 66 form the elastic pieces 67 and also have the following role. That is, as indicated by the frame-shaped portion insertion direction F1 in FIG. 1, when the frame-shaped portion 51 is inserted into the frame-shaped body portion 30 from the fixed member 1 side and the holding member 20 and the anti-vibration member 50 are assembled, the first engagement portions 43 are moved into the slits 66. Further, as indicated by the insertion portion insertion direction F2 in FIG. 1, when the insertion portion 81 is inserted into the frame-shaped portion 51 from the opposite side to the fixed member 1 and the anti-vibration member 50 and the fixing member 80 are assembled, the fifth engagement portions 91 provided in the insertion portion 81 are also moved into the slits 66.

In both edges in the width direction on the outer surface of the elastic piece 67, a pair of second protrusion ridges 71, 71 which are protrusion ridges extending in the insertion portion insertion direction F2 are provided. Each second protrusion ridge 71 extends on the outer surface of the wall 55 beyond a base end of the elastic piece 67 from one end of the elastic piece 67, and the other end thereof is connected to the flange 58 included in the contact portion 57. That is, it is also said that the second protrusion ridge 71 extends to the outer surface of the elastic piece 67 and the outer surface of the wall 55.

When the frame-shaped portion 51 is inserted into the frame-shaped body portion 30, as illustrated in FIG. 17, the second protrusion ridge 71 comes into pressing contact (also comes into contact) with the inner surface of the wall 33 included in the frame-shaped body portion 30.

That is, as illustrated in FIG. 15, in the state where the inner surface of the elastic piece 67 is pressed by the pressing protrusion 103, as illustrated in FIG. 17, the outer surface of the second protrusion ridge 71 provided on the outer surface of the elastic piece 67 comes into pressing contact with the inner surface of the frame-shaped body portion 30, that is, the inner surface of the wall 33 included in the frame-shaped body portion 30. That is, the outer surface of the second protrusion ridge 71 serves as an "outer surface of the frame-shaped portion" in the present invention.

A recessed groove 73 with a recessed groove shape is formed at a portion between each second protrusion ridge 71 and the third engagement portion 69 adjacent thereto on the outer surface of the elastic piece 67. As illustrated in FIG. 17, the recessed grooves 73 are separated from the inner surface (here, the inner surface of the wall 33) of the frame-shaped body portion 30 when the frame-shaped portion 51 is inserted into the frame-shaped body portion 30.

More specifically, in the state where the frame-shaped portion 51 is inserted into the frame-shaped body portion 30, the recessed grooves 73 are separated from the inner surfaces of the pair of protrusions 39, 39 included in the walls 33 and are also separated from boundary portions (corners) of the protrusions 39 and the inner surfaces 39a (see FIG. 17).

Further, as illustrated in FIG. 16, the fourth engagement portions 75 are provided at positions near the other end 51b on the inner surfaces of the pair of walls 55, 55 included in the frame-shaped portion 51. Referring together to FIG. 5, the pair of fourth engagement portions 75, 75 protrudes from both sides of the inner surface of each wall 55 in the width direction. That is, the anti-vibration member 50 in the embodiment includes a total of four fourth engagement portions 75. The fourth engagement portions 75 can engage with the sixth engagement portions 93 provided in the fixing member 80 (see FIG. 16).

Next, the fixing member 80 will be described with reference to FIGS. 6 to 9, 13 to 17, and the like.

The fixing member 80 includes the insertion portion 81 that is inserted into the frame-shaped portion 51 and receives the shaft member 5, the locking portions 94 that are provided inside the insertion portion 81 and are locked to the shaft member 5, and the flange 95 that is overhung on one end 81a side of the insertion portion 81.

The insertion portion 81 in the embodiment includes a pair of first extension portions 83, 83 that have a long plate shape extending by a predetermined length in the insertion direction in which the insertion portion 81 is inserted into the frame-shaped portion 51 (insertion portion insertion direction F2) and face each other in parallel, a distal end 85 that is connected to distal ends of the pair of first extension portions 83, 83 (the end of the insertion portion 81 on the other end 81b side), and a push-in portion 87 that is connected to the base ends of the pair of first extension portions 83, 83 (the end of the insertion portion 81 on the one end 81a side, has a substantially quadrangular plate shape, and is a portion that is pushed by a worker assembling the holder 10.

Figure 9:
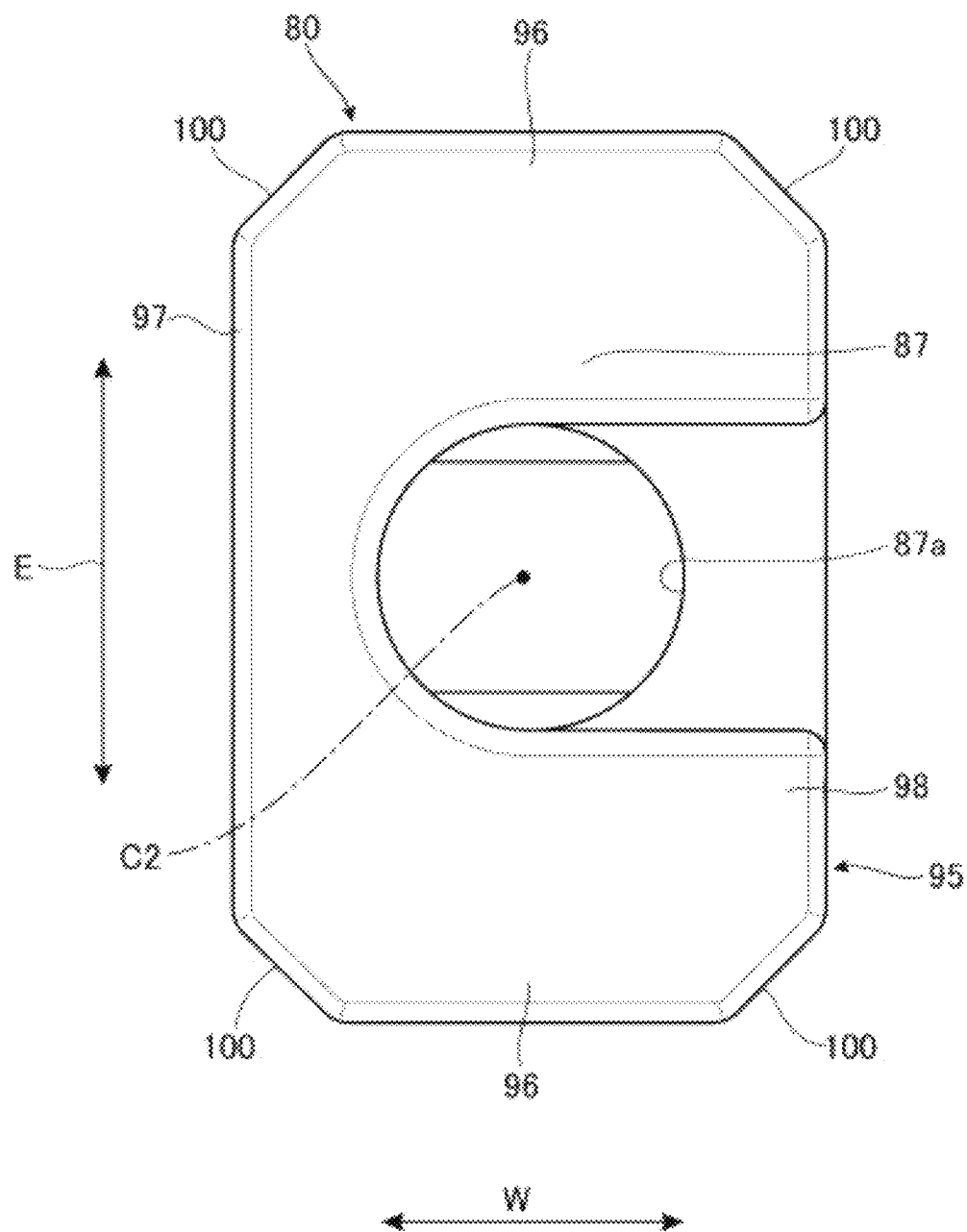
FIG. 9 is a plan view illustrating the fixing member.

In the intermediate portions of the push-in portion 87 and the distal end portion 85, circular shaft holes 85a and 87a into which the shaft member 5 is inserted are formed, respectively (see FIGS. 8 and 9). A portion passing through the center of the shaft holes 85a and 87a is a center C2 (see FIG. 17) of the insertion portion 81.

Further, the pair of second extension portions 88 and 89 extending in a columnar shape along the insertion portion insertion direction F2 are disposed at portions between the distal end 85 and the push-in portion 87 at positions which do not interfere with the shall member 5 inserted into the shaft holes 85*a* and 87*a*. The distal end 85 and the push-in portion 87 are connected to each other by the pair of second extension portions 88 and 89, and thus the entire fixing member 80 is reinforced.

As illustrated in FIG. 17, the pair of second extension portions 88 and 89 positionally deviate to be separated from each other with respect to the center C2 of the insertion portion 81 when the insertion portion 81 is viewed from the cross-section orthogonal to the axial direction. Here, the second extension portion 88 which is on one side positionally deviates to the downside of a paper surface of FIG. 17 with respect to the center C2 of the insertion portion 81, and the second extension portion 89 which is on the other side positionally deviates to the upside of the paper surface of FIG. 17 with respect to the center C2 of the insertion portion 81.

Further, as illustrated in FIGS. 1 and 6, the fifth engagement portions 91 engaging the first engagement portions 43 of the holding member 20 and the sixth engagement portions 93 engaging with the fourth engagement portions 75 of the anti-vibration member 50 are provided on the outer surface of the insertion portion 81.

In the embodiment, the fifth engagement portions 91 protrude in a planar direction of each first extension portion 83 (a direction orthogonal to an arrangement direction of the pair of first extension portions 83, 83 and along the outer surface of the first extension portions 83) from predetermined positions of both side edges 84, 84 (see FIG. 6) located on both sides of each first extension portion 83 included in the insertion portion 81 in the width direction (the direction orthogonal to the arrangement direction of the pair of first extension portions 83, 83).

The sixth engagement portions 93 are formed at positions closer to the fixed member 1 than the fifth engagement portions 91, specifically, positions close to the end (the distal end 85) in the insertion portion insertion direction F2, on both the side edges 84, 84 of each first extension portion 83.

In the insertion portion 81, four fifth engagement portions 91 and four sixth engagement portions 93 are provided. As illustrated in FIG. 16, the fifth engagement portions 91 face the first engagement portions 43 provided in the frame-shaped body portion 30 of the holding member 20, and thus can engage with the first engagement portions 43. On the other hand, the sixth engagement portions 93 can engage with the fourth engagement portions 75 provided in the anti-vibration member 50.

As illustrated in FIG. 7, the fixing member 80 includes the plurality of locking portion 94 locked to the shaft member 5. Each locking portion 94 has a shape extending slantly inwards to the one end 81*a* side of the insertion portion 81 from the inner surface (a surface facing the inner space of the insertion portion 81) of the first extension portion 83 and the plurality of locking portion 94 are provided in each first extension portions 83.

As illustrated in FIG. 14, a distal end 94*a* of each locking portion 94 in the extension direction is locked to the shaft member 5 (here, the distal end 94*a* is locked to a screw groove of a stud bolt which is the shaft member 5). As a result, the holder 10 is fixed to the fixed member 1 via the shaft member 5.

The flange 95 is overhung from the outer circumference of the one end 81*a* of the push-in portion 87 included in the insertion portion 81.

As illustrated in FIGS. 6 and 8, the flange 95 in the embodiment includes a pair of first flanges 96 that are an outer circumference of the one end 81*a* of the push-in portion 87 and are overhung from portions in which the pair of first extension portions 83, 83 are disposed, and a pair of second flanges 97 and 98 that are an outer circumference of the one end 81*a* of the push-in portion 87 and are orthogonal to the pair of first flanges 96 and overhung from portions in which the pair of second extension portions 88 and 89 are disposed. The second flange 97 is disposed on the second extension portion 88 side and the second flange 98 is disposed on the second extension portion 89 side (see FIG. 8).

As illustrated in FIGS. 2 and 12, both sides on the rear surface (the surface facing the frame-shaped body portion 30) side of the pair of second flanges 97 and 98 in the width direction come into contact with and are placed on the inner surfaces of the distal ends 61, 61 of the pair of extension pieces 60, 60. The intermediate portion of the rear surface side of the second flange 98 in the width direction comes into contact with and is placed on the end of a predetermined wall 55 included in the frame-shaped portion 51 on the one end 51*a* side.

On the other hand, as illustrated in FIGS. 6 and 7, a recessed portion 97*a* is formed in the intermediate portion of the second flange 97 in the width direction on the rear surface side of the second flange 97. Therefore, the intermediate portion of the second flange 97 in the width direction on the rear surface side does not come into contact with the end of a predetermined wall 55 included in the frame-shaped portion 51 on the one end 51*a* side (see FIG. 15).

As illustrated in FIG. 9, when the fixing member 80 is viewed in a planar direction (when viewed from the insertion portion insertion direction F2), the flange 95 has a substantially rectangular shape of which the outer circumference extends by a predetermined length. A direction in which the flange 95 extends is referred to as an extension direction E and a direction orthogonal to the extension direction E is referred to as a width direction W.

The flange 95 is formed with a width narrower than the width of the extension piece 60 provided in the anti-vibration member 50. As a result, in a state where the frame-shaped portion 51 is inserted into the frame-shaped body portion 30, the insertion portion 81 is inserted into the frame-shaped portion 51, and the anti-vibration member 50 and the fixing member 80 are assembled in the holding member 20, the flange 95 is not overhung (does not protrude) from the outer circumferential edges of the pair of extension pieces 60, 60.

Figure 13:
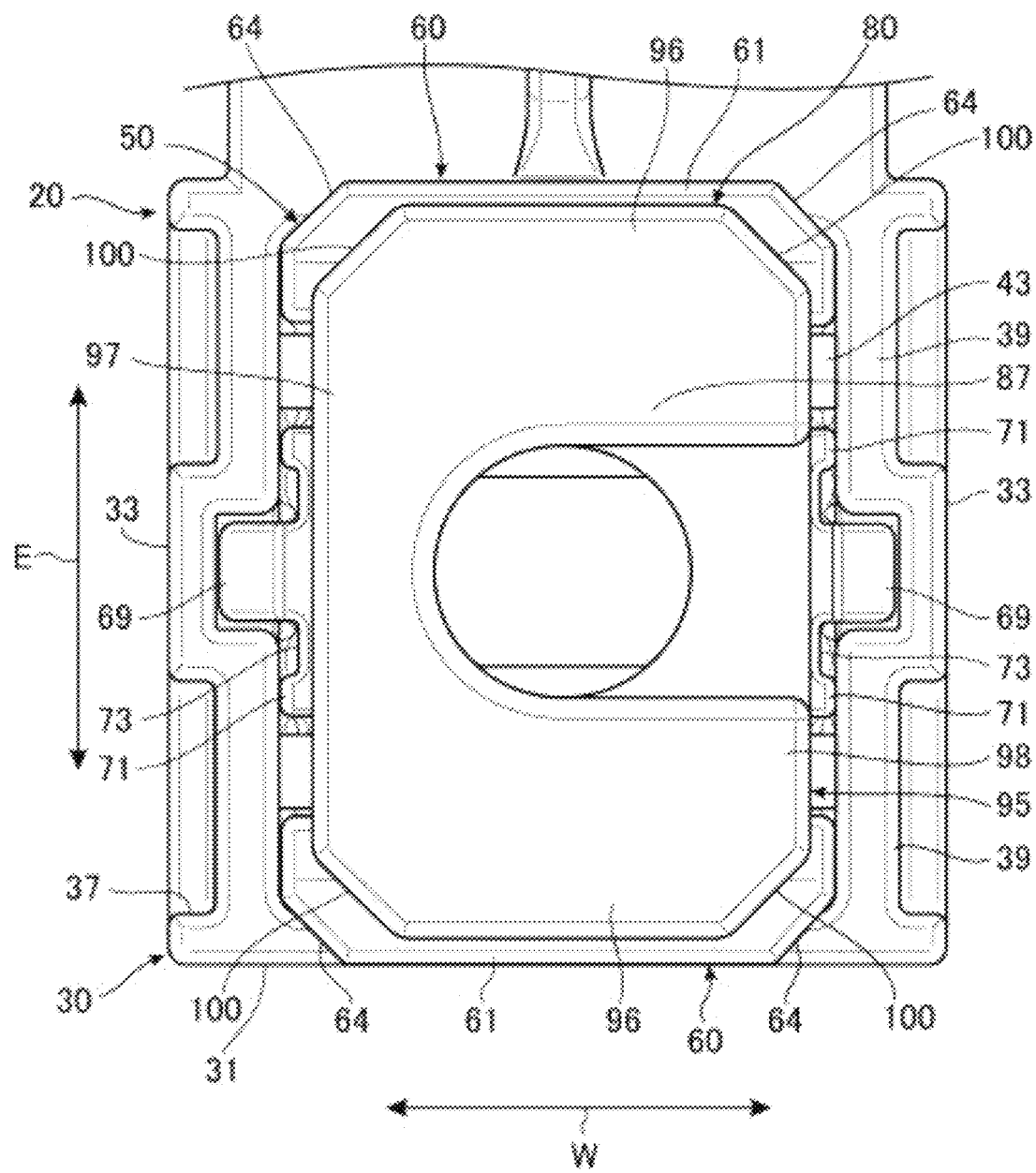
FIG. 13 is an enlarged plan view illustrating main portions of the assembled members in the holder fir the long member according to the present invention.

As illustrated in FIG. 13, in the flange 95, flange-side tapered portions 100 are formed at a position corresponding to the extension piece-side tapered portions 64 when viewed from the insertion direction in which the insertion portion 81 is inserted into the frame-shaped portion 51 (the insertion portion insertion direction F2).

Further, as illustrated in FIG. 7, a pressing surface 101 that has a tapered shape, presses the inner surface of the distal end 61 of the extension piece 60, and curves the extension piece 60 outwards is formed at the end of the insertion portion 81 on the flange 95 side.

When the insertion portion 81 is inserted and pushed into the frame-shaped portion 51 after the frame-shaped portion 51 is inserted into the frame-shaped body portion 30, the pair of pressing surfaces 101, 101 press the inner surfaces (here, the tapered surfaces 63, 63) of the distal ends 61, 61 of the pair of extension pieces 60, 60 and press apart the pair of extension pieces 60, 60 (see FIGS. 12 and 14).

The pressing protrusions 103, 103 protrude in portions opposite to the insertion portion insertion direction F2 on the outer surfaces of the pair of second extension portions 88 and 89. Further, as illustrated in FIG. 6, the pressing protrusions 103, 103 protrude outwards from the outer surfaces of the portions of the pair of second extension portions 88 and 89 opposite to the insertion portion insertion direction F2 further than the outer surfaces of portions of the pair of second extension portions 88 and 89 in the insertion portion insertion direction F2.

As illustrated in FIGS. 6 and 7, in the embodiment, the pressing protrusions 103, 103 protrude from portions of the insertion portion 81 on the one end 81a side (portions on the base end side and one end side) on the outer surfaces of the pair of second extension portions 88 and 89. The pressing protrusions 103 are protrusions protruding outwards further than outer surfaces (also referred to as outer edges) of portions of the pair of second extension portions 88 and 89 in the insertion portion insertion direction F2 (the portions on the distal end side and the other end side of the insertion portion 81). Referring together to FIG. 15, each pressing protrusion 103 includes a pressing surface 104 that extends in parallel in the insertion portion insertion direction F2 and a tapered surface 105 in which a protrusion amount gradually decreases from the distal end of the pressing surface 104 toward the insertion portion insertion direction F2.

When the frame-shaped portion 51 is inserted into the frame-shaped body portion 30 and the insertion portion 81 is inserted into the frame-shaped portion 51, the pressing surfaces 104 and the tapered surfaces 105 of the pair of pressing protrusions 103, 103 press the tapered surface 67a, 67a of the inner surfaces of the distal ends of the pair of elastic pieces 67, 67, as illustrated in FIG. 15, and the outer surfaces of the pair of second protrusion ridges 71, 71 come into pressing contact with the inner surfaces of the protrusions 39, 39 of the pair of walls 33, 33 included in the frame-shaped body portion 30, as illustrated in FIG. 17.

Modification

In the holding member, all the portions (the holding portion, the frame-shaped body portion, the first engagement portions, the second engagement portions, and the like) are integrally formed with a known synthetic resin material. The shape, the structure, the layout, and the like of each portion of the holding member are not particularly limited.

The holding portion 21 in the embodiment can retain and hold two long members P. However, for example, the holding portion may have a structure capable of retaining and holding one long member or three or more long members. Further, the frame-shaped body portion 30 in the embodiment includes four first engagement portions 43 and the pair of second engagement portions 45, 45, but the number of engagement portions is not particularly limited.

In the anti-vibration member, all the portions (the frame-shaped portion, the contact portions, the extension pieces, the elastic pieces, the first and second protrusion ridges, the third and fourth engagement portions, and the like) are integrally formed with an elastic resin material with anti-vibration performance, such as rubber or an elastic elastomer. Further, the shape, the structure, the layout, and the like of each portion of the anti-vibration member are not particularly limited.

In the embodiment, the pair of extension pieces 60, 60 are included, but two or more pairs of extension pieces may be included. The extension pieces 60 in the embodiment is pressed by the pressing surfaces 101 which are parts of the insertion portion 81 of the fixing member 80 to be bent and deformed, but the extension pieces may have a structure that is bent and deformed by being pressed by a flange of the fixing member.

Further, in the embodiment, the pair of third engagement portions 69 and the four fourth engagement portions 75 are included, but the number of engagement portions is not particularly limited. Two first protrusion ridges 65 and two second protrusion ridges 71 extend on the outer surfaces of the walls 53 and 55, but the first and second protrusion ridges may be provided alone, or may be three or more.

Further, in the fixing member, all the portions (the insertion portion, the fifth and sixth engagement portions, the locking portions, the flanges, and the like) are integrally formed with a known synthetic resin material. Further, the shape, the structure, the layout, and the like of each portion of the fixing member are not particularly limited.

Further, in the embodiment, the outer circumferential shape of the flange 95 is a substantially rectangular shape. However, the outer circumferential shape of the flange may be, for example, a square shape, a triangular shape, a polygonal shape more than a pentagonal shape, a circular shape, an oval shape, an elliptical shape, a rugby ball shape, or the like or may have a width narrower than the width of the extension piece.

The fifth engagement portions 91 protrude from both the side edges 84 of the first extension portions 83 in the width direction. However, for example, the fifth engagement portions 91 may protrude from the outer surfaces of the first extension portions 83.

Further, in the embodiment, the pressing protrusions 103 are provided on the outer surfaces of the second extension portions 88 and 89. However, for example, the pressing protrusions may be provided on the outer surfaces of the first extension portions 83 (which will be described in a second embodiment to be described below).

In the embodiment, as illustrated in FIG. 15, each pressing protrusion 103 presses the inner surface of the distal end of the elastic piece 67, and thus the outer surface of the second protrusion ridge 71 comes into pressing contact with the inner surface of the frame-shaped body portion 30. However, for example, the apex 69b of the third engagement portion 69 provided on the outer surface of the elastic piece 67 may be brought into pressing contact with the inner surface of the wall 33 of the frame-shaped body portion 30.

Operation and Effect

Next, a method of using the holder 10 that has the foregoing configuration will be described.

First, the holder 10 including the holding member 20, the anti-vibration member 50, and the fixing member 80 is assembled.

That is, in a state where the third engagement portions 69 of the anti-vibration member 50 are positioned in a space between the pair of protrusions 39, 39 provided in the frame-shaped body portion 30, as indicated by the frame-shaped portion insertion direction F1 in FIG. 1 or 10, the frame-shaped portion 51 is inserted into the frame-shaped body portion 30 from the fixed member 1, that is, the one end 51a side of the frame-shaped portion 51 is inserted into the frame-shaped body portion 30 from the opening of the frame-shaped body portion 30 on the other end 36 side.

Then, the pair of first protrusion ridges 65, 65 come into sliding contact with the inner surfaces of the pair of walls 31, 31 of the frame-shaped body portion 30, the third engagement portions 69 are entered between the inner surfaces 39a, 39a of the pair of protrusions 39, 39 of the frame-shaped body portion 30, and the first engagement portions 43 are moved into the slits 66. Further, the outer surfaces of the third engagement portions 69 are pressed against the inner surfaces of the pair of walls 33, 33 of the frame-shaped body portion 30, and thus the pair of elastic pieces 67, 67 are inserted to be bent and deformed so that the distal ends are close to each other.

The frame-shaped portion 51 is pushed until the flange 58 of the contact portion 57 of the frame-shaped portion 51 comes into contact with the end surface of the frame-shaped body portion 30 on the other end 36 side. Then, the pair of extension pieces 60, 60 of the frame-shaped portion 51 protrude from the end surfaces of the frame-shaped body portion 30 on the one end 35 side (see FIG. 11).

In addition, the third engagement portions 69 climb over the second engagement portions 45 of the frame-shaped body portion 30, and the bent and deformed elastic pieces 67 are elastically returned. As illustrated in FIG. 15, the other end surface 69a of the third engagement portions 69 of the anti-vibration member 50 and the one end surface 45a of the second engagement portions 45 of the holding member 20 face each other at a predetermined clearance, the third engagement portions 69 and the second engagement portions 45 can engage with each other, and the anti-vibration member 50 can be assembled in the holding member 20.

Figure 11:
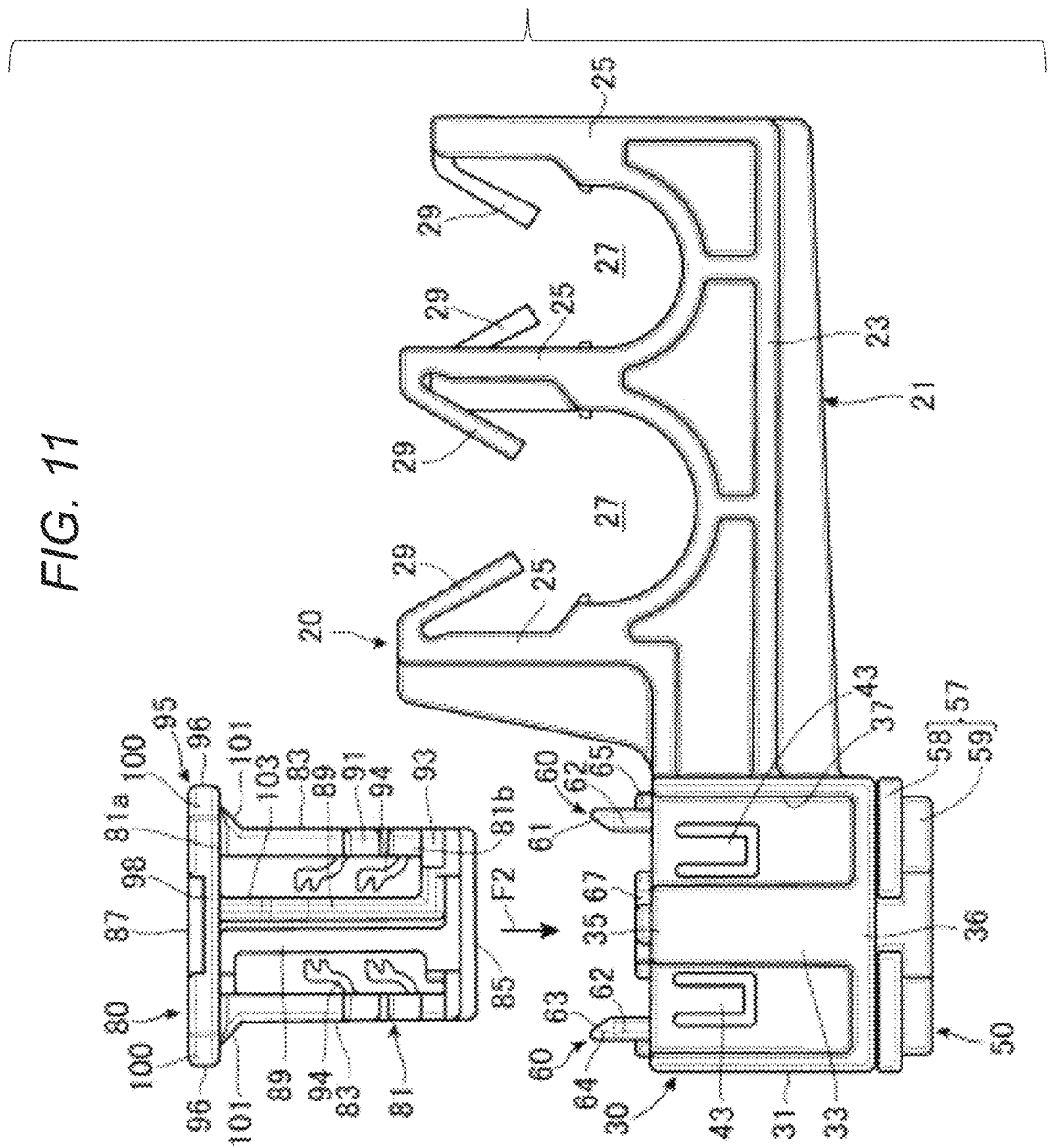
FIG. 11 is a diagram illustrating a second process in the assembly process.

Thereafter, in the state where the pair of fifth engagement portions 91, 91 of the insertion portion 81 of the fixing member 80 are positioned in the pair of slits 66, 66 of the frame-shaped portion 51 inserted into the frame-shaped body portion 30, as indicated by the insertion portion insertion direction F2 in FIG. 1 or 11, the insertion portion 81 is inserted into the frame-shaped portion 51 from the opposite side to the fixed member 1, that is, the other end 81b side of the insertion portion 81 is inserted into the frame-shaped portion 51 from the opening of the one end 51a side of the frame-shaped portion 51.

Then, the pair of fifth engagement portions 91, 91 of the insertion portion 81 are moved into the pair of slits 66, 66 of the frame-shaped portion 51, the fifth engagement portions 91 press the first engagement portions 43 of the frame-shaped body portion 30, and the first engagement portions 43 are bent and deformed outwardly of the frame-shaped body portion 30.

Further, when the insertion portion 81 is pushed into the frame-shaped portion 51, the inner surfaces (here, the tapered surfaces 63, 63) of the distal ends 61, 61 of the pair of extension pieces 60, 60 are pressed by the pair of pressing surfaces 101, 101 provided in parts of the insertion portion 81 so that the pair of extension pieces 60, 60 are bent and deformed to be curved outwards.

The pushing-in is performed until the outer surfaces of the distal ends 61, 61 of the pair of extension pieces 60, 60 come into contact with the end surfaces of the pair of walls 31, 31 included in the frame-shaped body portion 30 on the one end 35 side, and the pair of first flanges 96, 96 included in the flanges 95 conic into contact with the inner surfaces of the distal ends 61, 61 of the pair of extension pieces 60, 60.

Then, the maximum insertion position of the insertion portion 81 to be inserted into the frame-shaped portion 51 is regulated, the fourth engagement portions 75 of the frame-shaped portion 51 are entered into the sixth engagement portions 93 of the insertion portion 81, and the sixth engagement portions 93 and the fourth engagement portions 75 engage with each other (see FIG. 16), so that the fixing member 80 can be assembled in the anti-vibration member 50.

In addition, each fifth engagement portion 91 climbs over each first engagement portion 43, and thus each first engagement portion 43 is elastically returned. As illustrated in FIG. 16, the first engagement portion 43 and the fifth engagement portion 91 face at a predetermined clearance, and thus the first engagement portion 43 and the fifth engagement portion 91 can engage with each other.

As illustrated in FIG. 14, the pair of pressing surfaces 101, 101 are in close contact with the inner surface of the pair of extension pieces 60, 60, the pair of first flanges 96, 96 are placed on the inner surfaces of the distal ends 61, 61 of the pair of extension pieces 60, 60, and the distal ends 61 of the extension pieces 60 are sandwiched between the end surfaces of the walls 31 on the one end 35 side and the first flanges 96.

Further, as illustrated in FIG. 15, each pressing protrusion 103 provided in the fixing member 80 comes into pressing contact with the inner surface of each elastic piece 67 provided in the holding member 20.

As illustrated in FIG. 15, both sides on the rear surface side of the second flange 97 in the width direction are placed on the distal end 61 of one extension piece 60. Further, both sides on the rear surface side of the second flange 98 in the width direction are placed on the distal end 61 of the other extension piece 60, and the intermediate portion of the rear surface side of the second flange 98 in the width direction are placed on the end of the predetermined wall 55 included in the frame-shaped portion 51 on the one end 51a side.

As illustrated in FIG. 15, the pressing surfaces 104 and the tapered surfaces 105 of the pair of pressing protrusions 103, 103 press the tapered surfaces 67a, 67a of the inner surfaces of the distal ends of the pair of elastic pieces 67, 67. As illustrated in FIG. 17, the outer surfaces of the pair of second protrusion ridges 71, 71 come into pressing contact with the inner surfaces of the protrusions 39, 39 of the pair of walls 33, 33 included in the frame-shaped body portion 30.

As described above, after the holder 10 is assembled, the holder 10 is fixed to the fixed member 1 via the shaft member 5. That is, the holder 10 is pushed toward the fixed member 1 in a direction close to the fixed surface 3.

Then, the shaft member 5 passes through an opening of the frame-shaped portion 51 on the other end 51b side from the other end side of the shaft member 5, is received inside the insertion portion 81, and is locked to the plurality of locking portions 94. Thereafter, by pushing the holder 10 until the pedestal 59 of the contact portion 57 of the frame-shaped portion 51 comes into contact with the fixed surface 3, the holder 10 can be fixed to the fixed member 1 via the shaft member 5.

Subsequently, by inserting the long member P into the holding space 27 of the holding portion 21, it is possible to hold the long member P by the holding claws 29 and arrange the long member P in the fixed member 1 via the holder 10 (see FIG. 12). The long member P may be held before the holder 10 is fixed to the fixed member 1.

In the holder 10, when the frame-shaped portion 51 is inserted into the frame-shaped body portion 30 and the insertion portion 81 is inserted into the frame-shaped portion 51, the pressing protrusions 103, 103 provided in the extension portions (the second extension portions 88 and 89) press the inner surfaces (the inner surfaces of the distal ends of the pair of elastic pieces 67, 67) of the frame-shaped portion 51, and the outer surfaces (the outer surfaces of the second protrusion ridges 71) of the frame-shaped portion 51 accordingly come into pressing contact with the inner surfaces (the inner surfaces of the protrusions 39, 39 of the pair of walls 33, 33) of the frame-shaped body portion 30 (see FIGS. 15 and 17).

Figure 18:
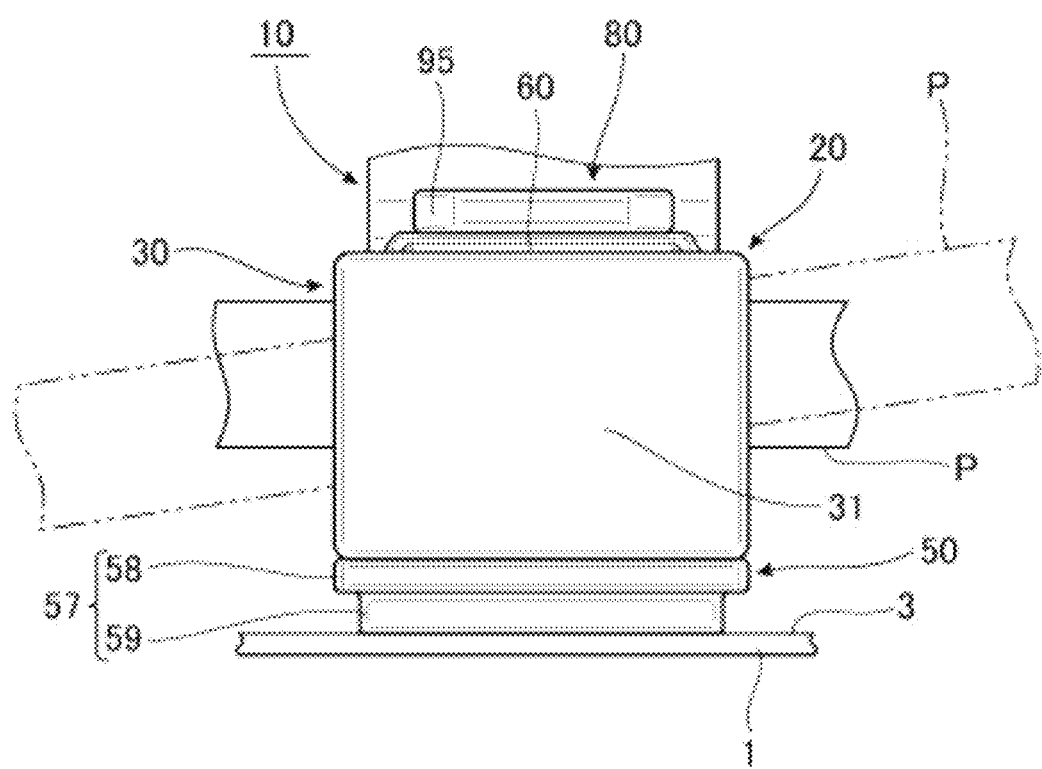
FIG. 18 is a diagram illustrating a case where a force that twists a long member is applied to the long member held in the holding portion of the holding member in the holder for the long member according to the present invention.

Therefore, even when a force that twists the long member P held in the holding portion 21 (hereinafter simply referred to as a "twisting force"), that is, for example, as indicated by a two-dot chain line in FIG. 18, a force that causes the long member P to approach or move away from the fixed surface 3 of the fixed member 1 is applied, tilting, toppling, falling, or the like of the frame-shaped body portion 30 can be inhibited, and thus the frame-shaped body portion 30 of the holding member 20 can be hindered from interfering with the fixing member 80.

As a result, in the holder 10, a transmission path of vibration hardly occurs without involving the anti-vibration member 50 (it is possible to suppress the generation of a transmission path of vibration that occurs when the frame-shaped body portion 30 and the fixing member 80 come into contact with each other). Therefore, the anti-vibration member 50 can have sufficient anti-vibration performance.

In the embodiment, as illustrated in FIG. 6, the pressing protrusions 103 protrude outwards from the outer surfaces of the portions of the pair of second extension portions 88 and 89 opposite to the insertion portion insertion direction F2 further than the outer surfaces of the portions of the pair of second extension portions 88 and 89 in the insertion portion insertion direction F2.

According to the foregoing aspect, the pressing protrusions 103, 103 protrude from the outer surfaces of the portions of the pair of second extension portions 88 and 89 opposite to the insertion portion insertion direction F2. Therefore, from a time at which the insertion portion 81 is be inserted into the frame-shaped portion 51 to a time at which the flanges 95 approach or come into contact with the distal ends 61, 61 of the pair of extension pieces 60, 60, the pressing protrusions 103 do not press the inner surface of the frame-shaped portion 51. When the flanges 95 come into pressing contact with the distal ends 61, 61, the pressing protrusions 103 press the inner surfaces of the frame-shaped portion 51 for the first time.

As a result, since an insertion resistance when inserting the insertion portion 81 into the frame-shaped portion 51 can be reduced, the insertion portion 81 can be smoothly inserted into the frame-shaped portion 51.

Since the inner surface of the frame-shaped portion 51 on one end 51a side is pressed locally and strongly by the pressing protrusions 103, a pressing contact force of the outer surface of the frame-shaped portion 51 to the inner surface of the frame-shaped body portion 30 can be increased. As a result, it is possible to inhibit tilting or the like of the frame-shaped body portion 30 more efficiently when the twisting force is applied to the long member P.

Further, in the embodiment, the engaged portions (the second engagement portions 45) are provided on the inner surface of the frame-shaped body portion 30. Further, when the frame-shaped portion 51 is inserted into the frame-shaped body portion 30, the engagement portions (the third engagement portions 69) engaging with the engaged portions are provided on the outer surface of the frame-shaped portion 51. The pressing protrusions 103 press locations which are fitted at positions at which the third engagement portions 69 are provided on the inner surface of the frame-shaped portion 51 (see FIG. 15).

According to the foregoing aspect, the pressing protrusions 103 press the locations which are fitted at the positions at which the third engagement portions 69 are provided on the inner surface of the frame-shaped portion 51. Therefore, at the engagement locations of the third engagement portions 69 and the second engagement portions 45, it is possible to improve a pressing contact strength on the outer surface of the frame-shaped portion 51 with respect to the inner surface of the frame-shaped body portion 30. Tilting or the like of the frame-shaped body portion 30 is inhibited while reliably maintaining an attachment state of the holding member 20 and the anti-vibration member 50, and anti-vibration performance of the anti-vibration member 50 can be sufficiently achieved.

The holding member 20 and the anti-vibration member 50 can have a shape structure which can be engaged efficiently and functionally. When the pressing protrusions press locations unrelated to the engagement between the engaged portions and the engagement portions, it is difficult to achieve a reliable attachment state. Therefore, there is a possibility of anti-vibration performance deteriorating.

In the embodiment, in the frame-shaped portion 51, the bendable and deformable elastic pieces 67 are formed via the pair of slits 66, 66, the engagement portions (the third engagement portions 69) are provided in the elastic pieces 67, and the inner surfaces of the elastic pieces 67 are pressed by the pressing protrusions 103.

When the frame-shaped portion 51 is inserted into the frame-shaped body portion 30, it is necessary for the third engagement portions 69 provided on the outer surface of the frame-shaped portion 51 to climb over the engaged portions (the second engagement portions 45) provided on the inner surface of the frame-shaped body portion 30. At this time, in the present embodiment, the third engagement portions 69 are formed in the bendable and deformable elastic pieces 67 via the pair of slits 66, 66. Therefore, the third engagement portions 69 can easily climb over the second engagement portions 45, and thus it is easy to insert the frame-shaped portion 51 into the frame-shaped body portion 30.

Since the pressing protrusions 103 press the inner surfaces of the bendable and deformable elastic pieces 67, the bending and deformation of the elastic pieces 67 can be regulated, an engagement force of the third engagement portions 69 and the second engagement portions 45 can be maintained, and the state where the frame-shaped portion 51 is inserted into the frame-shaped body portion 30 can be reliably maintained.

Further, in the embodiment, the protrusion ridges (the second protrusion ridges 71) extending in the insertion portion insertion direction F2 are provided on the outer surface of the elastic pieces 67. The second protrusion ridges 71 come into pressing contact with the inner surfaces of the frame-shaped body portion 30 when the frame-shaped portion 51 is inserted into the frame-shaped body portion 30 (see FIG. 17).

According to the foregoing aspect, the second protrusion ridges 71 provided on the outer surfaces of the elastic pieces 67 come into pressing contact with the inner surface of the frame-shaped body portion 30 when the frame-shaped portion 51 is inserted into the frame-shaped body portion 30. Therefore, the elastic pieces 67 partially come into pressing contact with the inner surface of the frame-shaped body portion 30. As a result, an area of a portion to which vibration from the holding member 20 is transmitted can be reduced, compared to a case where the entire elastic pieces 67 come into pressing contact with the inner surface of the frame-shaped body portion 30. Therefore, since a spring constant of the anti-vibration member 50 can be lowered, the anti-vibration performance of the anti-vibration member 50 can be further improved.

By providing the second protrusion ridges 71 on the outer surfaces of the elastic pieces 67, it is possible to more reliably bring the outer surface of the frame-shaped portion 51 into pressing contact with the inner surface of the frame-shaped body portion 30.

Further, in the embodiment, the recessed groove 73 that has a recessed groove shape is formed at a portion between the protrusion ridge and the engagement portion (the second protrusion ridge 71 and the third engagement portion 69) on the outer surface of the elastic piece 67. When the frame-shaped portion 51 is inserted into the frame-shaped body portion 30, the recessed grooves 73 are separated from the inner surface (the inner surfaces of the walls 33) of the frame-shaped body portion 30 (see FIG. 17).

According to the foregoing aspect, the recessed grooves 73 formed at portions between the second protrusion ridges 71 and the third engagement portions 69 are separated from the inner surface of the frame-shaped body portion 30 when the frame-shaped portion 51 is inserted into the frame-shaped body portion 30. Therefore, since the elastic pieces 67 can reliably and partially come into pressing contact with the inner surface of the frame-shaped body portion 30, the anti-vibration performance of the anti-vibration member 50 can be further improved.

By forming the recessed grooves 73, it is possible to bend and deform the elastic pieces 67 more easily. Therefore, even when the pressing protrusions 103 are provided in the fixing member 80, it is easy to insert the insertion portion 81 inside the frame-shaped portion 51. That is, there is a concern that the provision of the pressing protrusions 103 protruding outwards max make it difficult to insert the insertion portion 81 into the frame-shaped portion 51, but since the elastic pieces 67 are easily bent and deformed outwards, there is no problem in inserting the insertion portion 81 into the frame-shaped portion 51.

Further, in the embodiment, as illustrated in FIG. 13, the flanges 95 of the fixing member 80 are formed with a width narrower than the width of the extension piece 60 of the anti-vibration member 50.

Therefore, even when the twisting force is applied to the long member P held in the holding portion 21, the frame-shaped body portion 30 of the holding member 20 can be hindered from interfering with the flanges 95 of the fixing member 80. That is, even when the twisting force is applied to the long member P and the frame-shaped body portion 30 is to come into contact with the flanges 95, the frame-shaped body portion 30 comes into contact with the extension pieces 60 of the anti-vibration member 50 at first. Therefore, the frame-shaped body portion 30 is inhibited from coming into direct contact with the flanges 95.

As a result, in the holder 10, a transmission path of vibration hardly occurs without involving the anti-vibration member 50. Therefore, anti-vibration performance of the anti-vibration member 50 can be sufficiently achieved.

Even when the twisting force is applied to the long member P held in the holding portion 21 in the holder 10, anti-vibration performance of the anti-vibration member 50 can be more reliably achieved because of synergistic effects of the effect obtained by the structure as described above (see FIGS. 15 and 17) and the effect obtained by the structure in which the flanges 95 of the fixing member 80 have the widths narrower than the widths of the extension pieces 60 of the anti-vibration member 50.

Second Embodiment of Holder for Long Member

Figure 19:
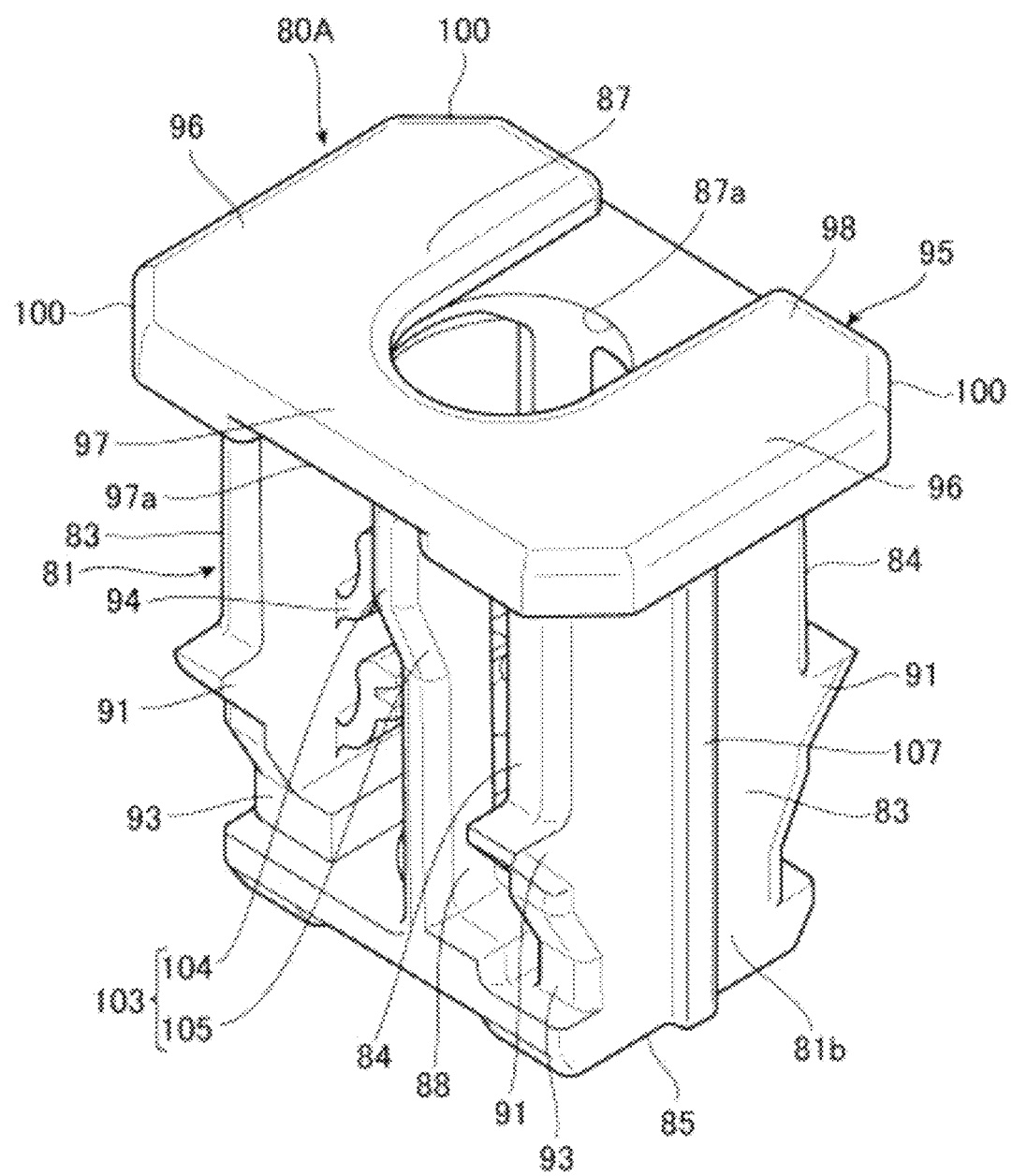
FIG. 19 illustrates a second embodiment of a holder for a long member according to the present invention, and is an enlarged perspective view illustrating a fixing member included in the holder.
Figure 20:
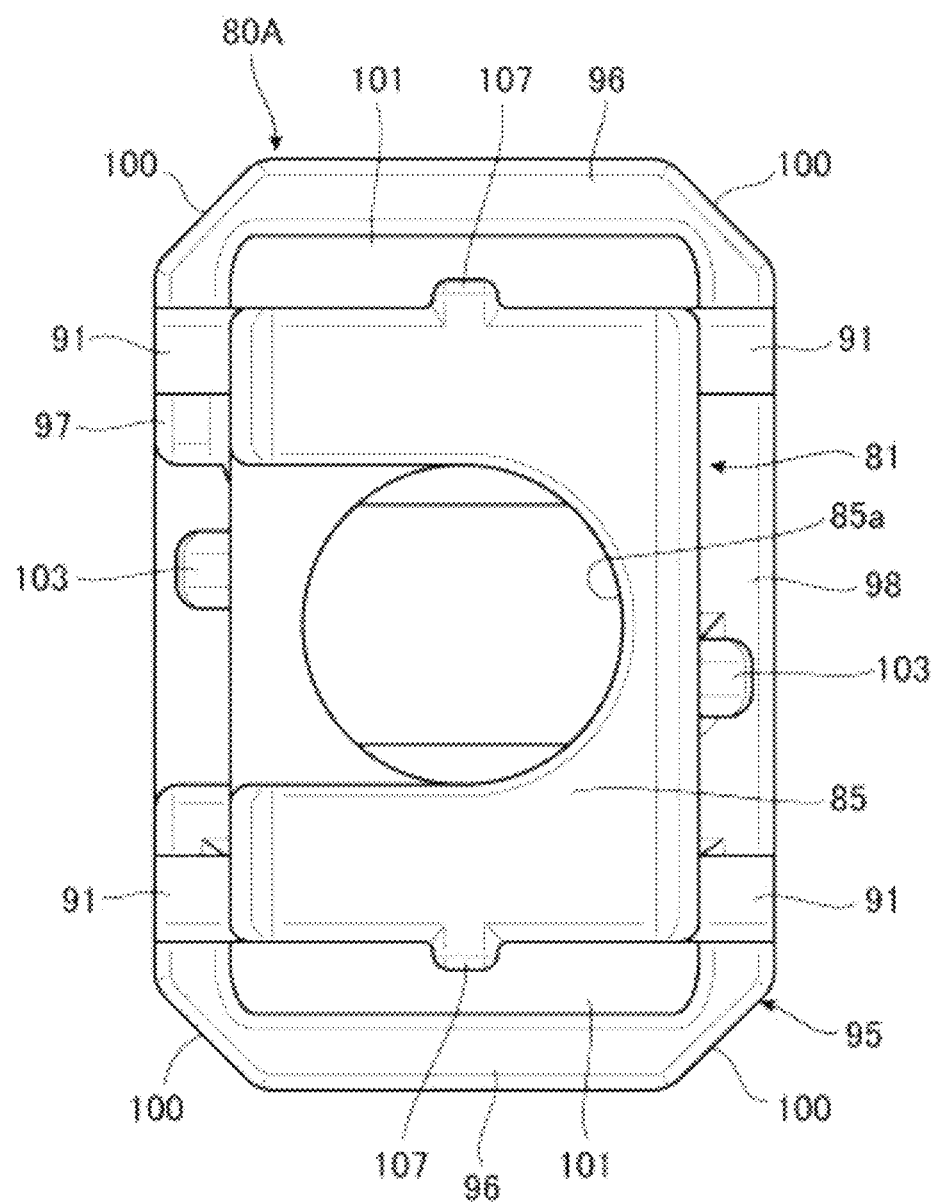
FIG. 20 is a bottom view illustrating the holder.
Figure 21:
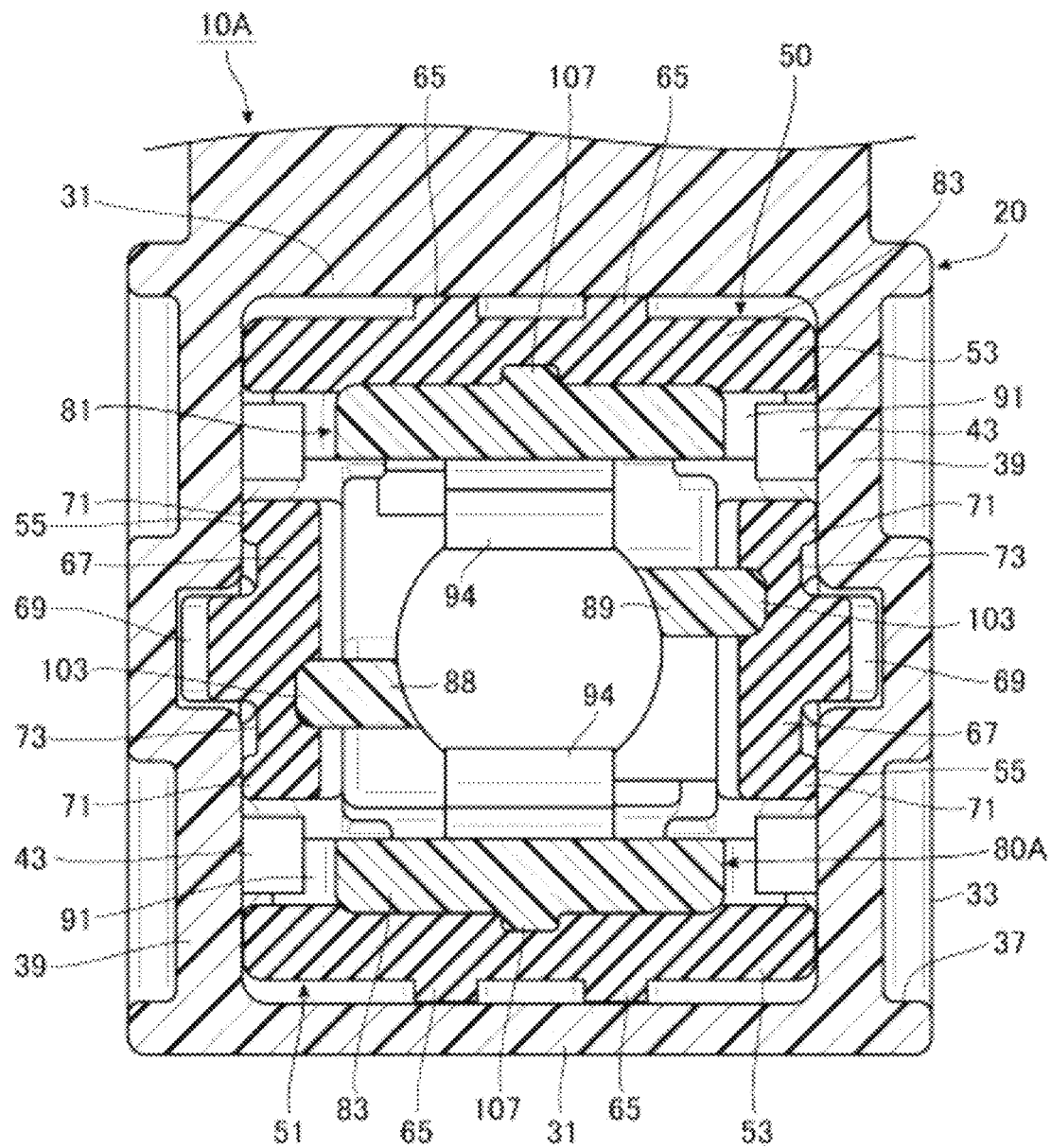
FIG. 21 is a cross-sectional view illustrating the holder.

FIGS. 19 to 21 illustrate a second embodiment of a holder for a long member according to the present invention. The same reference numerals denote substantially the same portions as those of the foregoing embodiments, and description thereof will be omitted.

A holder 10A tier a long member (hereinafter also simply referred to as the "holder 10A") according to the second embodiment illustrated in FIG. 21 is different from that of the first embodiment in a shape of a fixing member.

That is, as illustrated in FIGS. 19 and 20, in a fixing member 80A in the embodiment, a pressing protrusion 107 which is a protrusion ridge extends in the intermediate portion of the outer surfaces of the pair of first extension portions 83, 83 included in the insertion portion 81 in the width direction. In each pressing protrusion 107, one end of the pressing protrusion 107 is connected to the rear surface of the first flange 96 and the other end extends to the other end of the first extension portion 83.

As illustrated in FIG. 21, when the frame-shaped portion 51 is inserted into the frame-shaped body portion 30 and the insertion portion 81 is inserted into the frame-shaped portion 51, the pressing protrusions 103, 103 provided in the second extension portions 88 and 89 press the inner surface (the inner surfaces of the distal ends of the pair of elastic pieces 67, 67) of the frame-shaped portion 51, and the pressing protrusions 107, 107 provided in the first extension portions 83, 83 press the inner surface (the inner surfaces of the pair of walls 53, 53) of the frame-shaped portion 51.

Accordingly, the outer surface (the outer surfaces of the second protrusion ridges 71, 71) of the frame-shaped portion 51 comes into pressing contact with the inner surface (the inner surfaces of the protrusions 39, 39 of the pair of walls 33, 33) of the frame-shaped body portion 30, and the outer surface (the outer surfaces of the first protrusion ridges 65, 65) of the frame-shaped portion 51 comes into pressing contact with the inner surface (the inner surfaces of the pair of walls 31, 31) of the frame-shaped body portion 30.

That is, in the embodiment, the outer surface of the frame-shaped portion 51 comes into pressing contact with the inner surface of the walls 31 and 33 included in the frame-shaped body portion 30. As a result, even when a twisting force is applied to the long member P held in the holding portion 21 in various directions, tilting or the like of the frame-shaped body portion 30 can be flexibly inhibited effectively. Thus, the frame-shaped body portion 30 can be hindered from interfering with the fixing member 80 and anti-vibration performance of the anti-vibration member 50 can be sufficiently achieved.

Third Embodiment of Holder for Long Member

Figure 22:
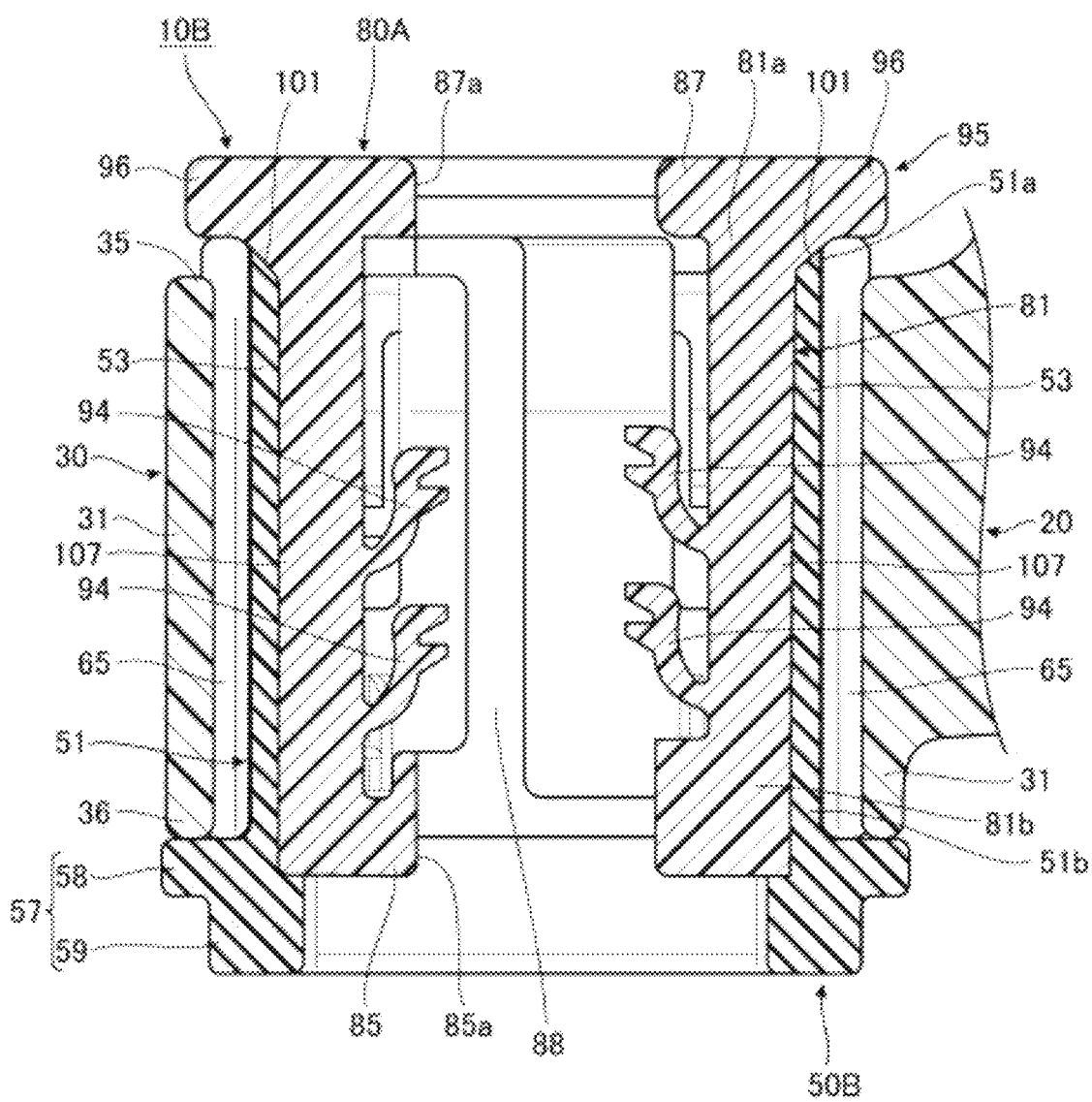
FIG. 22 illustrates a third embodiment of a holder for a long member according to the present invention, and is an enlarged sectional view illustrating main portions of the holder.

FIG. 22 illustrates a third embodiment of a holder for a long member according to the present invention. The same reference numerals denote substantially the same portions as those of the foregoing embodiments, and description thereof will be omitted.

In a holder 10B for a long member (hereinafter also simply referred to as the "holder 10B") according to the third embodiment illustrated in FIG. 22, the fixing member 80A is similar to that of the foregoing second embodiment (the shape of the pressing protrusion ridges 107) and is different from that of the foregoing embodiments in a shape of an anti-vibration member.

That is, an anti-vibration member 50B in the embodiment has a structure in which the pair of extension pieces 60, 60 are not included. As illustrated in FIG. 22, in a state where the frame-shaped portion 51 is inserted into the frame-shaped body portion 30, portions of the pair of walls 53, 53 and the pair of walls 55, 55 included in the frame-shaped portion 51 on the one end 51*a* side protrude by a predetermined length from the opening of the frame-shaped body portion 30 on the one end 35 side (in FIG. 22, only the walls 53 are illustrated for convenience).

In the stale where the anti-vibration member 50B and the fixing member 80A are assembled in the holding member 20, the pressing protrusions 103, 103 provided in the second extension portions 88 and 89 press the inner surface (the inner surfaces of the distal ends of the pair of elastic pieces 67, 67) of the frame-shaped portion 51 and the pressing protrusions 107, 107 provided in the first extension portions 83, 83 press the inner surface (the inner surfaces of the pair of walls 53, 53) of the frame-shaped portion 51. In addition, the rear surfaces of the flanges 95 of the fixing member 80A come into contact with the pair of walls 53, 53 included in the frame-shaped portion 51 and the ends of the first protrusion ridges 65 protruding at the outer surfaces of the walls 53 on the one end 51*a* side, and the ends of the pair of walls 55, 55 included in the frame-shaped portion 51 on one end 51*a* side.

In the embodiment, as in the foregoing embodiments, when a twisting force is applied to the long member P held in the holding portion 21, tilting or the like of the frame-shaped body portion 30 can be inhibited and the frame-shaped body portion 30 can be hindered from interfering with the fixing member 80A, and anti-vibration performance of the anti-vibration member 50B can be sufficiently achieved.

The present invention is not limited to the foregoing embodiments, but may be modified in various modified embodiments within the scope of the gist of the present invention and these embodiments are also included in the scope of the present invention.

What is claimed is:

1. A holder for a long member that is configured to be fixed to a fixed member including a shaft member via the shaft member and that is configured to hold the long member, the holder comprising:
   a holding member that includes a frame-shaped body portion to which a holding portion for holding the long member is connected;
   an anti-vibration member that is made of an elastic material and includes a frame-shaped portion configured to be inserted into the frame-shaped body portion; and
   a fixing member that is provided with an insertion portion configured to be inserted into the frame-shaped portion and configured to receive the shaft member, and a locking portion configured to be locked to the shaft member inside the insertion portion, wherein
   the insertion portion includes an extension portion extending in an insertion direction in which the insertion portion is inserted into the frame-shaped portion, and
   a pressing protrusion protrudes on an outer surface of the extension portion, and when the frame-shaped portion is inserted into the frame-shaped body portion and the insertion portion is inserted into the frame-shaped portion, the pressing protrusion presses an inner surface of the frame-shaped portion and an outer surface of the frame-shaped portion comes into pressing contact with an inner surface of the frame-shaped body portion.

2. The holder for the long member according to claim 1, wherein the pressing protrusion protrudes outwards from an outer surface of a portion of the extension portion opposite to the insertion direction further than an outer surface of a portion of the extension portion in the insertion direction.

3. The holder for the long member according to claim 1, wherein
   an engaged portion is provided on the inner surface of the frame-shaped body portion, and
   an engagement portion engaging with the engaged portion when the frame-shaped portion is inserted into the frame-shaped body portion is provided on the outer surface of the frame-shaped portion, and the pressing protrusion is configured to press a location which is fitted at a position at which the engagement portion is provided on the inner surface of the frame-shaped portion.

4. The holder for the long member according to claim 3, wherein a bendable and deformable elastic piece is formed in the frame-shaped portion via a pair of slits, the engagement portion is provided in the elastic piece, and the pressing protrusion is configured to press an inner surface of the elastic piece.

5. The holder for the long member according to claim 4, wherein
   a protrusion ridge extending in the insertion direction is provided on an outer surface of the elastic piece, and
   when the frame-shaped portion is inserted into the frame-shaped body portion, the protrusion ridge comes into pressing contact with the inner surface of the frame-shaped body portion.

6. The holder for the long member according to claim 5, wherein
   a recessed groove with a recessed groove shape is formed at a portion between the protrusion ridge and the engagement portion on the outer surface of the elastic piece, and
   when the frame-shaped portion is inserted into the frame-shaped body portion, the recessed groove is separated from the inner surface of the frame-shaped body portion.

* * * * *